US012549374B2

(12) United States Patent
Shields

(10) Patent No.: US 12,549,374 B2
(45) Date of Patent: Feb. 10, 2026

(54) AUTONOMOUS KEY MANAGEMENT FOR DATA, DIGITAL AND COMPUTATIVE DEVICES AND METHOD THEREFOR

(71) Applicant: AKM CYBER CORP., Saint Marks, FL (US)

(72) Inventor: Jon Barton Shields, Sterling Heights, MI (US)

(73) Assignee: AKM Cyber Corp., Arlington, VA (US)

( * ) Notice: Subject to any disclaimer, the term of this patent is extended or adjusted under 35 U.S.C. 154(b) by 70 days.

(21) Appl. No.: 18/737,475

(22) Filed: Jun. 7, 2024

(65) Prior Publication Data

US 2025/0379743 A1  Dec. 11, 2025

(51) Int. Cl.
*H04L 9/32* (2006.01)

(52) U.S. Cl.
CPC .......... *H04L 9/3236* (2013.01); *H04L 9/3247* (2013.01)

(58) Field of Classification Search
CPC .............................. H04L 9/3236; H04L 9/3247
See application file for complete search history.

(56) References Cited

U.S. PATENT DOCUMENTS

| 2022/0141004 | A1* | 5/2022 | Murray | ................. | H04L 9/0861 |
| | | | | | 713/171 |
| 2023/0254156 | A1* | 8/2023 | Jetzfellner | .............. | H04L 63/00 |
| | | | | | 713/176 |
| 2023/0412369 | A1* | 12/2023 | Tanaka | .................. | H04L 63/123 |

OTHER PUBLICATIONS

Çapraz, Seval & Ozsoy, Adnan. (2021). Personal Data Protection in Blockchain with Zero-Knowledge Proof. 10.1007/978-981-33-6470-7_7.

* cited by examiner

*Primary Examiner* — Azizul Choudhury
(74) *Attorney, Agent, or Firm* — The Concept Law Group, P.A.; Robert C. Kain, Jr.

(57) ABSTRACT

The secure data system and communicative method is deployed on first and second edge nodes (the $1^{st}$ node may be a network manager (NM)). Each edge node has a processor, a data store (with a file), and a secure data enclave. A keyed hash message authentication code (HMAC) is separately run on each node's processor, data store, file, and the HMAC is stored in the respective enclave. The first node (or NM) generates and stores in each node's enclave a synchronized security data set (SDSet) which includes the $1^{st}$ node/NM's HMAC, creating an Autonomous Key Management Security Relationship (ASR) in both nodes. Communications from NM to designated node are accessed and processed by designated node only if the SDSet and HMAC match the enclave-stored HMAC and SDSet.

26 Claims, 25 Drawing Sheets

Fig. 1A

| Universal | PKI | AKM |
|---|---|---|
| Breach Exposure to Human Error | 88% - 95% | 5% - 12% |
| Passwords, Keys, Certificates, Tokens | Managed | Eliminated |
| Zero Trust Level | LOW: Must trust: Passwords, Keys, Certificates, Tokens | HIGH: Trust only needed at Provisioning |
| Post-Quantum | Vulnerable, pending NIST updates | Safe today, Safe tomorrow |

| Data in Flight | PKI | AKM |
|---|---|---|
| Autonomous Secure Sessions (TLS 2.x) | No | Yes |
| Session Keys & Entropy | Static, Must trust Certificates & Asymmetric Key Exchange | Dynamic Entropy, Zero Knowledge, Symmetric |
| Identity Theft, Spoofing | Passwords, Keys, Certificates, Tokens | None |

Fig. 1B

| Data at Rest | PKI | AKM |
|---|---|---|
| (1) Data (2) Device (3) System Keys | All 3 Static, Post-Quantum Vulnerable | All 3 Dynamic, Post-Quantum Safe |
| Re-key Cadence | Per Compliance Requirement, Post-Quantum Vulnerable | Autonomous, Post-Quantum Safe |
| Cyber Attacker Dwell Time | Days (Ransomware) to Years (State Actor) | Minutes |

| Data in Use | PKI | AKM |
|---|---|---|
| Malware | Enabled (does not prevent Spoofing, has Low Zero Trust) | Unauthorized |
| Attack Lateral Movement & Privilege Escalation | Enabled | Unavailable |
| Attack Command and Control | Enabled | Inaccessible |
| Software Supply Chain (SBOM) | Spoofable | Transparent, Reliable, Post-Quantum Safe |

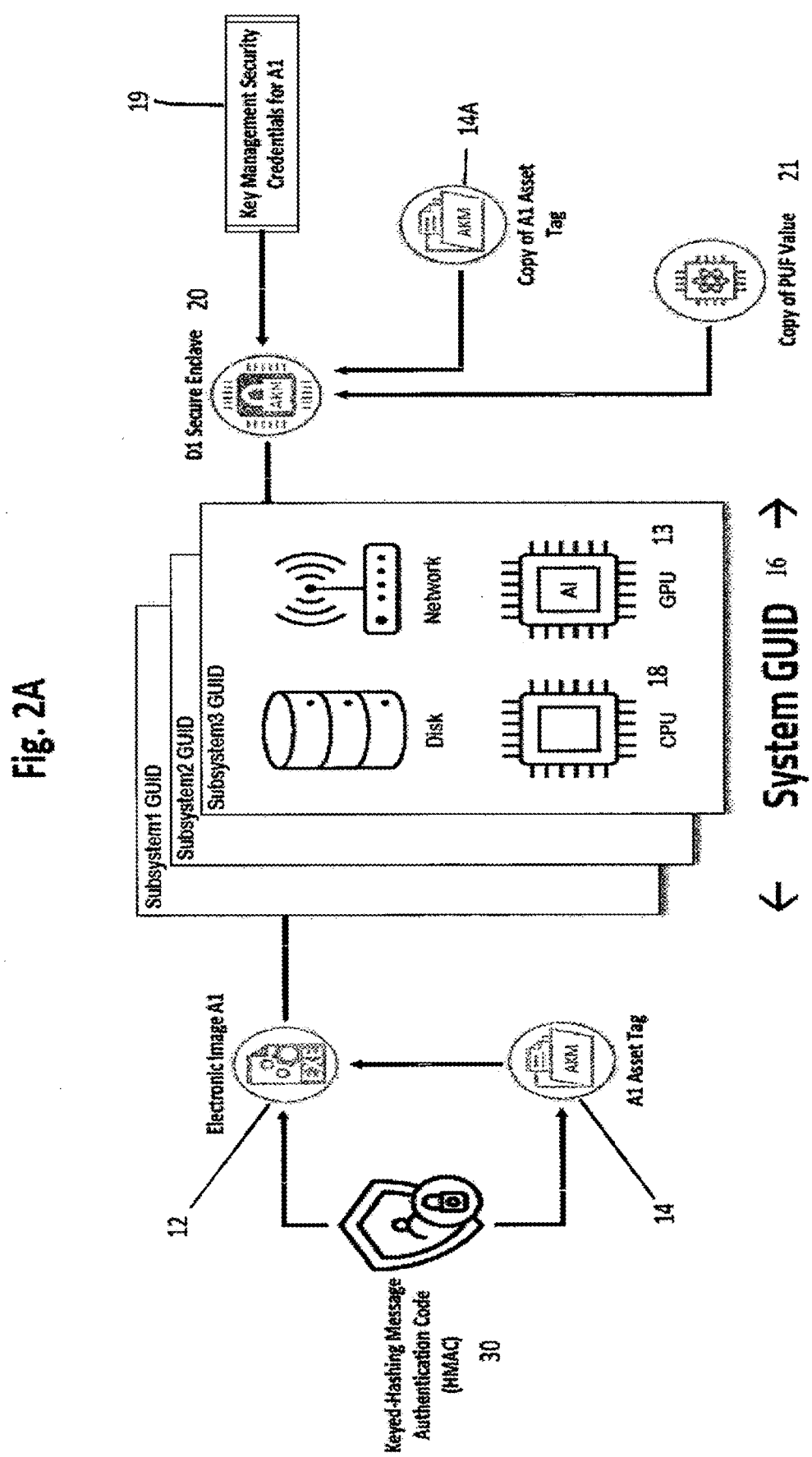

Failsafe - Content Free Finite State Machine 90

FIG. 13

ABBREVIATIONS Table

| | |
|---|---|
| ADF | AKM Data Frame – The AKM Data Frame refers to the normal user data frame encrypted within the AKM framework. |
| AES | Advanced Encryption Standard is a symmetric encryption algorithm and a block cipher. |
| AIM | Asset Integrity Management. An AKM add-on [QUESTION] that adheres to CENELEC 50701 and ISA/IEC and autonomously monitors the integrity of the entire system and runs for perpetuity with minimal overhead. |
| AKM | Autonomous Key Management is a fully decentralized, share-nothing symmetric encryption system, which has no cloud dependency, supports air gapped configurations, and is quantum safe. |
| ANV | Add Node Vector, as in QLS Frame Processing for ANV for the FSM of FIG. 11 |
| ASR | AKM Security Relationship, sometimes deployed at edge nodes and otherwise in software. |
| BEK | bulk encryption key; see also NS-BEK (next session) and CS-BEK (current session) |
| BSP | Binary Space Partitioning is implemented for recursively subdividing a space into two convex sets by using hyperplanes as partitions, sometimes in the form of BSP tree data structure. |
| CEK | Check Encryption Key (CEK) Event for FSM of FIG. 11 |
| CEK | Check Encryption Key (CEK) – Checks to see if either the current session key or next session key can decrypt the frame. |
| CIF | Check Initialized Flag (CIF) State, an FSM State |
| CNS | Check for Next Session (CNS) Security Credentials State, an FSM State |
| CS-BEK | Current Session-Bulk Encryption Key – This is the Bulk Encryption Key associated with the current AKM session. |
| CSK | Check Session Key (CSK) State, an FSM State |
| DCF | Discard Current Frame (DCF) – Indicates that the current frame should be ignored and discarded. |
| DFCS | Decrypted Frame with CS-BEK (DFCS) Event for FSM of FIG. 11 |
| DFNS | Decrypted Frame with NS-BEK (DFNS) Event for FSM of FIG. 11 |
| DIC | Device Integrity Code. A hash code (HMAC) run over an aggregate of information directly associated with a device, including all of the electronic image components that are specified to be part of a device. |

| | FIG. 13 (continued) |
|---|---|
| DN | Do Nothing (DN) |
| DUN | Deactivate Unresponsive Nodes (DUN) – Deactivate for the current session only the Edge Nodes within the ASR that have not participated in Session Initiation. |
| ERROR | Process Error (ERROR) |
| FBCS | Factory Backend Configuration Server, sometimes including, a Database, and includes the Secure Enclave. [QUESTION – true?] |
| FIC | File Integrity Code (FIC) is derived by taking the digital signature of the coupling between an HMAC of electronic image asset and the electronic image's asset tag. |
| Finite State Events | Start AKM (SKAM) Event (Ev); Receive AF (RAF) Ev; Session Initialized Flag (SIF) Ev; Session Activated Flag (SAF) Ev; SIF Time Out (SIFTO) Ev; SAF Time Out (SAFTO) Ev; Next Session Broadcast Frame Time Out (NSBTO) Ev; Initialized Flag Timeout (IFTO) Ev; Next Session Timeout (NSTO) Ev; Initialized Flag Not Set (IFNS) Ev; Initialized Flag Set (IFS) Ev; Next Session Transition Not Completed (NSTNC) Ev; Next Session Transition Completed (NSTC) Ev; Could NOT Decrypt Frame with CS-BEK (NDCS) Ev; Check Encryption Key (CEK) Ev; Decrypted Frame with NS-BEK (DFNS) Ev; Could NOT Decrypt Frame with NS-BEK (NDNS) Ev; Decrypted Frame with CS-BEK (DFCS) Ev; and Could NOT Decrypt Frame with either the CS nor NS BEK (NDCSNSK) Ev. |
| FSM | Finite State Machine – The AKM Protocol Processing FSM is represented by an event/state diagram illustrating the logical progression through the processing of an AKM frame and the interrelationship with other AKM Edge Nodes. |
| FSM States | Session Start (SS) State; Session Establishment Frame (SEF); Wait for Initialized Flag (WIF) from All Nodes State; Check Initialized Flag (CIF) State; Session Active (SA) State; Initialized Flag Timeout (IFT) State; Check for Next Session (CNS) Security Credentials State; Check Session Key (CSK) State; Wait for Next Session Key (WNK) State; Next Session Timeout (NST) State; Try FallBack (TFB) State; and, Non-Fatal Exception (NFE) State, an FSM State. |
| GCM | Galois/Counter Mode, in cryptography, GCM is a mode of operation for symmetric-key cryptographic block ciphers which is adopted for performance. |
| HMAC | keyed-hashing message authentication code |
| IFNS | Initialized Flag Not Set (IFNS) Event for FSM of FIG. 11 |
| IFS | Initialized Flag Set (IFS) Event for FSM of FIG. 11 |

FIG. 13 (continued)

| | |
|---|---|
| IFT | Initialized Flag Timeout (IFT) State, an FSM State |
| IFTO | Initialized Flag Timeout (IFTO) Event for FSM of FIG. 11 |
| Irregular FSM Actions | Do Nothing (DN); Process Error (ERROR); Report Exception (REPTEXCP); Should Not Happen (SNH); Deactivate Unresponsive Nodes (DUN); Check Encryption Key (CEK); Retry Decryption with Next Session Key (RDNSK); Retry Decryption with Fallback Session Key (RDFBSK); Retry Decryption with Failsafe Session Key (RDFSSK) and Discard Current Frame (DCF). |
| KMS | Key Management System |
| NDCS | Could NOT Decrypt Frame with CS-BEK (NDCS) Event for FSM of FIG. 11 |
| NDCSNSK | Could NOT Decrypt Frame with either the CS nor NS BEK (NDCSNSK) Event for FSM of FIG. 11. |
| NDNS | Could NOT Decrypt Frame with NS-BEK (NDNS) Event for FSM of FIG. 11 |
| NFE | Non-Fatal Exception (NFE) State, an FSM State |
| NMM | AKM Network Management Module provides provisioning and maintenance capabilities for AKM Security Relationships (ASRs). |
| NS-BEK | Next Session-Bulk Encryption Key – This is the Bulk Encryption Key associated with the next AKM session. |
| NSBTO | Next Session Broadcast frame Time Out (NSBTO) Event for FSM of FIG. 11 |
| NST | Next Session Timeout (NST) State, an FSM State |
| NSTC | Next Session Transition Completed (NSTC) Event for FSM of FIG. 11 |
| NSTNC | Next Session Transition Not Completed (NSTNC) Event for FSM of FIG. 11 |
| NSTO | Next Session Timeout (NSTO) Event for FSM of FIG. 11 |
| NSV | Next Session Vector, as in QLS Frame Processing for NSV for the FSM of FIG. 11 |
| PAF | Process AKM Frame (PAF). |
| PDS | Parameter Data Subset (PDS). The AKM framework first selects the PDS from which the parameters will be used to create Next Session Credentials. |
| PDV | Parameter Data Vector (PDV) is an implementation specific vector that can be used across all nodes within an AKM Security Relationship. |

| | FIG. 13 (continued) |
|---|---|
| QLS | Query Languages are programming tools to fetch and manipulate data from databases; QLS enable users to input structured commands that resemble English language constructs. |
| QLS Frame Processing | SIV Session Integrity Vector, NSV Next Session Vector, ANV Add Node Vector, RNV Remote Node Vector |
| RAF | Receive AF (RAF) Event for FSM of FIG. 11 |
| RDFBSK | Retry Decryption with Fallback Session Key (RDFBSK) – indicates that neither the normal current session key nor the next session key are able to decrypt the current frame, so the next logical step is to see if the Fallback Session Key is able to decrypt the frame. |
| RDFSSK | Retry Decryption with Failsafe Session Key (RDFSSK) – indicates the current session key, the next session key, and the Fallback Session key, all failed to decrypt the frame. Thus, the next logical step is to see if the Failsafe Session Key is able to decrypt the frame. |
| RDNSK | Retry Decryption with Next Session Key (RDNSK) – indicates that the normal current session key does not work, so perhaps try the next session key to see if the rest of the AKM Security Relationship has started to transition to the next session. |
| REPTEXCP | Report Exception (REPTEXCP) – Exception Processing, similar to "Process Error", but more severe. Something must be done as a consequence of this being called, whereas "Error Processing" is more of a logging of a problem, but not necessarily any action that must occur as a consequence. |
| RNV | Remote Node Vector, as in QLS Frame Processing for RNV for the FSM of FIG. 11 |
| SA | Session Active (SA) State, an FSM State |
| SAF | Session Activated Flag – This is a bit within the "Flags" field of the AKM Header and is only set once all nodes have been acknowledged as having their Session Confirmed Flag bit set. |
| SAF | Session Activated Flag (SAF) Event for FSM of FIG. 11 |
| SAFTO | SAF Time Out (SAFTO) Event for FSM of FIG. 11 |
| SAKM | Start AKM (SKAM) Event for FSM of FIG. 11 |
| SCF | Session Confirmed Flag – This is a bit within the "Flags" field of the AKM Header and is only set once all nodes have set their "Session Initialized Flag" set. |
| SDesS | Software-defined security (SDS) is a model in which the information security is controlled. Prior art examples are fire walls, intrusion detection, and access controls, among others. |

| | FIG. 13 (continued) |
|---|---|
| SDS | Synchronized Data Set, a set of credentials for a specific ASR and resides within a secure element or other trust zone |
| SEF | Session Establishment Frame – This is a regular AKM data frame with the Session Initialized Bit Flag set. This term is intended to only refer to the very first frame transmitted with the Session Initialized Bit Flag set, which is determined by order of priority as configured within the ASR. |
| SEF | Session Establishment Frame (SEF) |
| SIF | Session Initialized Flag – This is a bit within the "Flags" field of the AKM Header and is used by all nodes within the ASR as the first step in the session instantiation process. |
| SIF | Session Initialized Flag (SIF) Event for FSM of FIG. 11 |
| SIFTO | SIF Time Out (SIFTO) Event for FSM of FIG. 11 |
| SIV | Session Integrity Vector, as in QLS Frame Processing for SIV for the FSM of FIG. 11 |
| SNH | Should Not Happen (SNH) – This indicates that the state machine somehow allowed an event that should never occur with the given state. Action is State/Event specific. |
| SS | Session Start (SS) State, an FSM State |
| SSIC | System Integrity Code is a 256-bit SHA256, resultant HMAC run over an aggregate of information directly associated with all of the subsystems comprising a system. |
| Standard Action FSM Descriptions | Transmit SIF (TSIF) broadcast; Process AKM Frame (PAF); Transmit NS Broadcast (TNSB) frame; Update Session Initialized Vector and Check if Session Initialized Vector is Complete (USIVCVC); Update Next Session Vector and Check if Next Session Vector is Complete (UNSVCNSVC). |
| TFB | Try FallBack (TFB) State, an FSM State |
| TNSB | Transmit NS Broadcast (TNSB) frame. |
| TSIF | Transmit SIF (TSIF) broadcast. |
| UNSVCNSVC | Update Next Session Vector and Check if Next Session Vector is Complete (UNSVCNSVC). |
| USIVCVC | Update Session Initialized Vector and Check if Session Initialized Vector is Complete (USIVCVC). |
| WIF | Wait for Initialized Flag (WIF) from All Nodes State, an FSM State |

| | FIG. 13 (continued) |
|---|---|
| WNK | Wait for Next Session Key (WNK) State, an FSM State |
| ZKA | Zero Knowledge Authentication enables an untrusted device (i.e., the "Prover") to participate in a ZKA secured relationship by proving a secret without exposing any hidden information about the secret to the other already trusted devices within the relationship. |

AUTONOMOUS KEY MANAGEMENT FOR DATA, DIGITAL AND COMPUTATIVE DEVICES AND METHOD THEREFOR

The present invention relates to an autonomous key management for data, digital and computative devices and method therefor. The computative system includes a plurality of edge nodes communicatively coupled to a network wherein the data security system operates on at least a first and a second edge node enabled to communicate with each other. Preferably, a network manager coordinates security with the plurality of edge nodes.

BACKGROUND

The present invention replaces the 50-year-old private key infrastructure (PKI) design. The current (circa 2024) risk of cyber-attack on data (stored, in transit and in action or operation) is documented in the 88-95% range.

The present invention seeks to reduce cyber-attacks about 88% based upon (a) avoided costs of tolling and data storage; (b) improved operational efficiency; (c) reduced cost of development; and (d) reduced impact of data breach.

SUMMARY OF THE INVENTION

The invention provides a autonomous key management for data, digital and computative devices and method that overcomes the security disadvantages in the prior art.

It is an object of the present invention to provide an improved data security system. One improved system for data in-transit (that is, in a messaging system and method). Another data security system for commutative components or computative assets. A further improved system for data at-rest (that is, stored data). It is another objective to provide an improved data security system and method for data in-process (that is, data that is being processed, albeit the security system operates at a point-in-time manner).

With the foregoing and other objects in view, there is provided, in accordance with the several aspects of the present invention, a system and a method involving the following concepts.

From a processing standpoint, one foundational embodiment of the present invention is a method of establishing and maintaining secure data communications in a computative system having a network manager and a first and a second edge node, all communicatively coupled together via to the network. The network manager (NM) has a NM processor, a NM data store, such as a database or other organized data structure, a NM data store, an NM identifier, and a NM edge node. There are first and second edge nodes also coupled to the network. Each edge node has a respective (a) first and second processor, (b) first and second data store, storing first and second files, and (c) first and second secure data enclave. The NM, via its NM edge node, generates and effects the storing, in the corresponding first and second edge node enclaves, first and second HMACs based upon the corresponding first and second processors and first and second data stores of the first and second edge nodes. At a security provisioning time, the NM applies the hash function to the NM identifier and the first and second HMACs to obtain a security data set (SDSet) and stores the SDSet in the NM data store and the first and second enclaves. This forms the AKM (autonomous key management) Security Relationship (ASR) between the NM and the first and second edge nodes. In some situation, the NM identifier is used as a secret device key created in the initial provisioning HMAC pass such that the first and second HMACs are highly unique.

Another foundational embodiment of the present invention is a computative system with a plurality of edge nodes coupled to the network, The data security system engages first and second edge nodes of such plurality. As discussed above, these edge nodes each include a processor, a data store with a file and a secure data enclave. The data store may include the secure data enclave. This data enclave stores a first hash message authentication code (HMAC) based upon a predetermined hash function applied to the respective first and second (separately, thereby generating unique HMACs) and the respective first and second data store at a first initial time. Typically, this is the provisioning time for each computative asset. Accordingly, the first and second HMACs are different due to different, for example GUIDs, hardware IDs, release times for the data files, different disc storage locations and different bootloading times for the data in the first and second data files. Also, the network manager may apply a separate device ID to each device, prior to the provisioning generation of the first and second HMACs. Other electronic differences may be captured by the respective device HMACs. At a security provisioning time (different than the computative device asset provisioning time), either the first edge node or the second edge node applies the hash function to both the first device HMAC and the second device HMAC to obtain a security data set (SDSet), and thereafter the either first or second edge node (via its processor) effects the storing of the SDSet in both first and second secure enclaves. This forms the ASR security relationship between these two edge nodes. The result being, at a messaging time, the first edge node via its processor generates and sends a first message incorporating the SDSet and the second HMAC to the second edge node. Further as a result, the second edge module via its processor accepts the first message if the SDSset and the second HMAC in the first message match an enclaved SDSset and second HMAC. It should be noted that the hash functions for the first and second HMACs may be different than the hash function for the SDSet. In some situation, the hash functions are the same (although the hashed resultant is always different). In other situation, the hash functions are different.

Refinements to these operational and structural aspects of the present invention include, in summary, the concept that the first HMAC is solely keyed to the first processor and first data store. The second HMAC is solely keyed to the second processor and second data store. Hence, first and second keyed HMACs are unique to the first and second edge nodes. Further, the SDSet is configured as a dual hash which encodes, by inclusion, the first and second HMACs and a security ID, forming the interrelated ASR relationship. Otherwise, the first and second hash functions are always different because the hash includes a "hash date/time" indicator. Since the HMAC of the first node must be generated at a different time than the HMAC generation of the second node, a second or dual hash over both the first and second HMACs creates a unique, but interrelated ASR relationship between the first and second edge nodes.

As further refinement of the present invention, the first and second secure enclaves have unique data store enclaves and the unique HMAC data stored therein includes a representation of corresponding bounded firmware images and hardware data in each of the first and second nodes. In this two-node system, prior to the security provisioning time, the second node processor sends and effects storage of the second HMAC to the first data store. The result is the first node stores the second node's highly distinctive and unique asset tag.

The secure data enclaves may be various enclaves including, but not limited to, hardware device data stores, dedicated data stores, onboard data stores, attachable data stores, fobs, dongles, and flash memory drives.

In another system configuration, the first edge node is a network manager (NM). The NM then includes a database (part of the first data store) or an organized data structure. The network manager and the second edge node form a key managed security relation group by sharing the SDSet. The NM's first processor stores the first and second HMACs and the SDSet in the database or data structure. In a data transfer or ASR validation test, the first message includes a message payload.

In an expanded configuration, wherein the first edge node is a network manager, the system further includes a third edge node with a respective processor, data store, and secure enclave. Of course, each edge node includes a designated network module communicatively coupling the node to the network. The third data store stores a NM identifier (from the NM) and a third HMAC (from the third edge node computative devices and data files) based upon the hash function applied to the respective third processor and data store, all at a respective initialization time via the network manager. At the third node's security provisioning time after initialization, the NM applies the hash function to the first, second and third HMACs to obtain a network security data set (nSDSet) and effecting respective storage of the nSDSet in corresponding first, second and third secure enclaves. At one follow-on messaging time, the NM generates and sends a respective follow-on message incorporating the nSDSet and the second HMAC to the second edge node. This engages the ASR relationship between the NM and the second node. At another follow-on messaging time, the NM generates and sends another message incorporating the nSDSet and the second HMAC and the third HMAC respectively to the second and third edge nodes. This engages the ASR relationship between the NM, the second node and the third node. The second edge node and second processor accepting the first follow-on message if the nSDSset and the second HMAC in the first message matches an enclaved nSDSset and second HMAC. In a further messaging event, the second and third edge nodes and respective second and third processors accepting the another follow-on message if the nSDSset and the respective second and third HMACs in the another message match an enclaved nSDSset and corresponding second and third HMACs.

In this manner, the second and third HMACs in combination with the nSDSet are respective digital signatures of the second and third edge nodes. At an additional third message time, the NM generates a third message having a message payload and a frame header digital signature. The frame header digital signature includes at least one of the second and third digital signatures. The NM's first processor encrypts the payload and the frame header digital signature with an encryption routine. The NM or the associated first edge node (which acts as a proxy for the NM, formats the third message with a relationship ID associating the network manager and a designated edge node which is at least one of the second and third edge nodes and wherein the relationship ID is not an encrypted portion of the third message. The designated edge target node accepts the third message and the message payload after decrypting the frame header digital signature, via its respective processor, using a complementary decryption routine. The payload is accepted and, if needed, processed, when the frame header digital signature matches the corresponding second and third HMACs and the combinatory nSDSet matches the corresponding HMAC in the designated edge node secure enclave.

In this manner, the message payload represents data in-transit, and the respective second and third processor in the designated edge node processes the data in-transit.

In a refined embodiment, the NM via its processor generates a next message session security credential. This session credential is refreshed for each third message and following message and is specific for a security relationship (ASR) between the NM and the second and third edge nodes per the nSDSet. The next message credential includes a parameter data vector (PDV) as an implementation specific vector used across the second and third nodes within the ASR security relationship.

Again, as a foundational methodology, the method of establishing and maintaining secure data communications between first and second edge nodes is effected when each edge node has a processor, a data store plus a file stored therein, and a secure data enclave. The methodology respectively generates and stores, in the corresponding first and second enclave, first and second unique hash message authentication codes (HMACs) based upon the corresponding first and second processors and data stores. The method further generates and stores, in first and second enclaves, a security data set (SDSet) as a further hash of both the first and second HMACs. This is the conceptual double hash function. This method enables processing of a message payload only if a communicated message having a transmitted SDSet and a transmitted HMAC, matches a respective first and second HMAC stored in the corresponding first and second enclave, and further the transmitted SDSet must match the SDSet stored in the corresponding first and second enclave.

The first and second files in respective data stores may include corresponding first and second firmware files. The resultant first and second HMAC then incorporate respective bounded firmware images as part the hash values. As explained earlier, the data enclave may be a hardware device data store, a dedicated data store, an onboard data store, an attachable data store, a fob, a dongle, and a flash memory drive.

When configured with a network manager NM, the network manager has a third edge node, a third processor, a third data store, and a third secure enclave. The NM generates and stores in the third enclave a third HMAC based upon the third processor and third data store. The generation of the SDSet includes the further hash of the first HMAC, the second HMAC and the third HMAC (from the NM). The network manager generates and transmits the communicated message with the message payload and transmits the SDSet and the transmitted HMAC to both the first and second edge nodes. The message payload is only processed by a corresponding first and second edge node if the transmitted SDSet and the transmitted HMAC matches a respective first and second HMAC stored in the corresponding first and second enclave of the corresponding first and second edge nodes.

Respective first and second digital signatures are formed with an additional hash of the corresponding first and second HMACs and the enclaved SDSet. The NM generates a header frame with at least one of the first and second digital signatures as a portion of the communicated message. The NM further encrypts, the payload and the frame header digital signature with an encryption routine. The NM also formats the communicated message with a relationship ID associating the NM and a designated edge node (at least one of the first and second edge nodes). The relationship ID is not encrypted. After decrypting the frame header digital signature, via a respective first and second processor using a complementary decryption routine, the designated edge node accepts the communicated message and accepts the message payload when a decrypted frame header digital signature matches a corresponding one of the first and second digital signatures and further matches the SDSet in the designated edge node secure enclave.

Although the invention is illustrated and described herein as embodied in a an autonomous key management for data, digital and computative devices and a method therefor, it is, nevertheless, not intended to be limited to the details shown because various modifications, programmable and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural, programmable and functional details disclosed herein are not to be interpreted as limiting, but merely as a basis for the claims and as a representative basis for teaching one of ordinary skill in the art to variously employ the present invention in virtually any appropriately detailed structure, data formats, programs and system configurations. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected", "transmitted" should be broadly interpreted, for example, it may be electronically connected in any manner, shape or form, that is electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," "module", and the like as used herein, are defined as a sequence of instructions designed for execution on a computer system. A "program," "computer program," or "software application" or "module" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 1A and 1B compare PKI with an AKM system on a technical level (FIG. 1A is the universal PKI vs. AKM (asset key management) comparison and a data in-flight comparison and FIG. 1B is the data-at-rest and data-in-use comparison) (see the Abbreviations Table in FIG. 13).

FIG. 2A diagrammatically illustrates an AKM key management security credential for electronic file image A1 (FIC-A1) and a security enclave The D1 operating on a copy of the image A1's GUID (the GUID being assigned, in this case, by the manufacturer) and the image A1 asset tag.

FIGS. 9A and 9B are two parts of a single illustrated system conjoined together and centered about Hardware Device D1. FIGS. 9A-9B diagrammatically show an AKM-AIM Device Authentication system-type flow chart. FIG. 9C diagrammatically shows production of the Device Integrity Code (DIC) for the hardware encased software and data storage system.

FIG. 13 is an Abbreviations Table providing a list of abbreviations used in the description of the present invention.

DETAILED DESCRIPTION

Figure 2B:
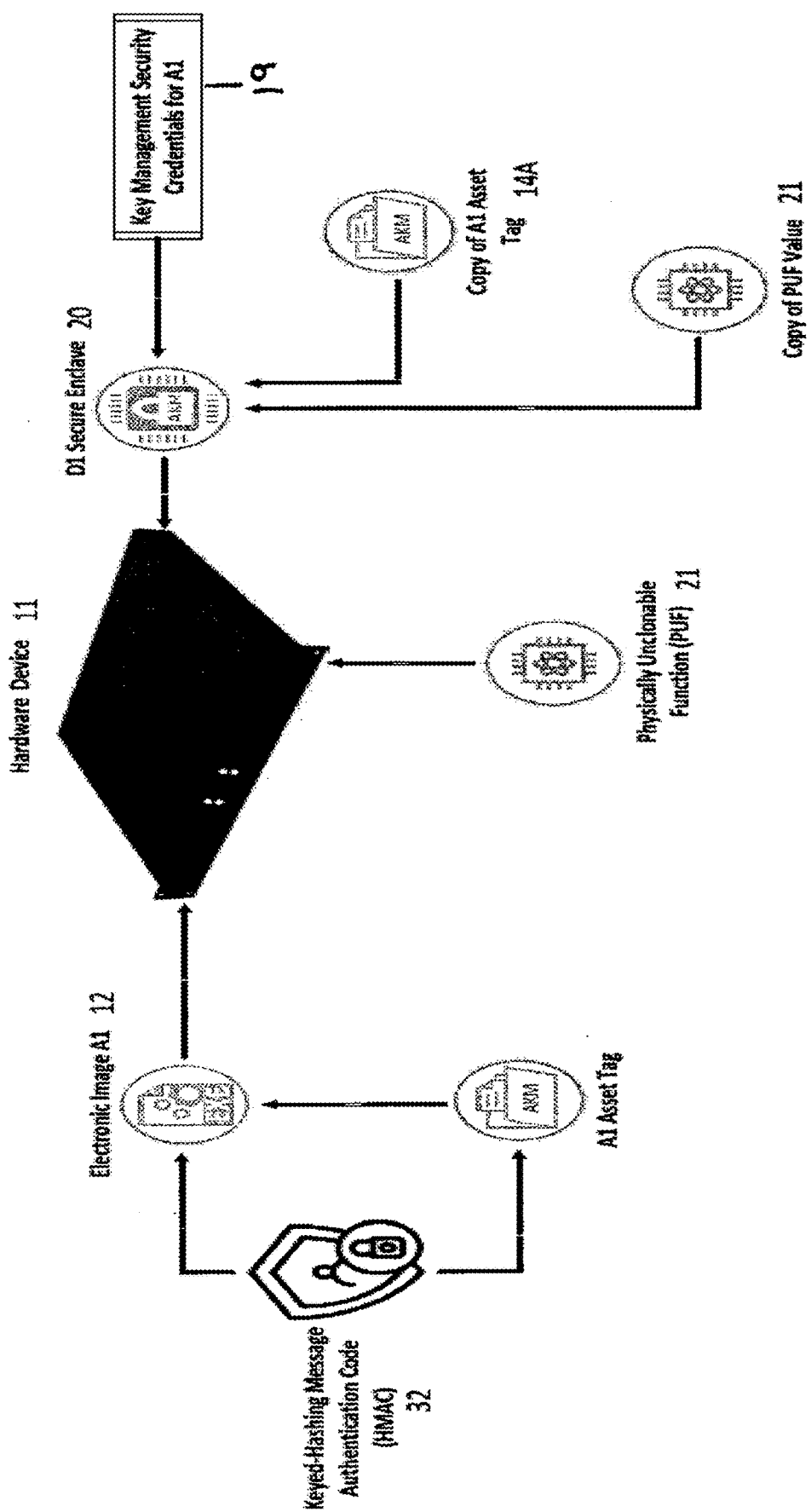
FIG. 2B diagrammatically illustrates another AKM protection of systems for data-at-rest wherein the digital signatures for the computative device are keyed-hash HMACs (hash message authentication codes) and the electronic image A1 and its network assigned A1 asset tag is in the HMAC of the entire computative device (sometimes referred to as an edge node computative device) and that device HMAC is stored in the secure enclave D1.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient autonomous key management (AKM) for data, digital and computative devices and a method therefor. Many of the abbreviations in the following discussion of various embodiments of the invention are listed in FIG. 13, an Abbreviations Table.

The Autonomous Key Management (AKM) is a computative system and method, preferably employs a network manager to provide data security to edge nodes and the computative assets associated with or as part of the edge nodes. The AKM is a fully decentralized, share-nothing symmetric encryption system, which has no cloud dependency, supports air gapped configurations, and is quantum-hack safe. AKM is implemented as a drop-in replacement for PKI+TLS (Transport Layer Security) and is a methodology for cyber protection of people, data, networks, resources, services, and devices that all but eliminates manual maintenance of the security network. Given that 88% of all cyber-attacks are a result of human error, managing passwords, certificates, keys, secrets or tokens, AKM key management provides substantial benefits to managing cybersecurity platforms.

AKM imposes a cybersecurity policy directly implemented and enforced without multiple layers or constant management. AKM achieves this by allowing security relationships to autonomously manage themselves. Hence, no humans are involved in the cyber protection loop. Once AKM implementation has been initially configured or provisioned, the network manages itself and recovers by itself, as needed.

AKM addresses all five pillars identified by the NIST (National Institute of Standards and Technology) as needed for a cybersecurity solution: 1) Identify; 2) Protect; 3) Detect; 4) Respond; and 5) Recover. Lastly, AKM also provides an Asset Integrity Management (AIM) module that adheres to CENELEC 50701 and ISA/IEC 62443 and is a good foundation to provide a customized and native SBOM (Software Bill of Materials) feature into preexisting systems. AKM and AIM autonomously monitors and runs without intervention with minimal overhead.

The AKM is a comprehensive autonomous cybersecurity solution that is substantially confidential and provides a high level of data integrity including: 1) Data-in-Transit (protecting communication data); 2) Data-at-Rest (protecting and validating both physical and virtual stored assets); 3) Data-in-Use (ensuring that only trusted programs can execute on data); 4) In-network Management Gateway (IMG) that allows for autonomous recovery, in accordance to policy in the event of a breach, attempted breach, or any other network wide issue that has been detected, enabling AKM to respond and recover without any human intervention necessary; and 5) Removes the Human Element from the management and distribution of security credentials. It should be noted that 88% to 95% of all data breaches are the result of human error.

The cyber-attack risk, associated with PKI security modules as compared with AKM security modules, can be categorized as follows: (A) Breach Exposure to Human Error for PKI (88%-95%) compared to AKM (5%-12%); (B) Passwords, Keys, Certificates, Tokens for PKI is managed but for AKM, it is eliminated; (C) Identity Theft, Phishing for PKI is always a risk, but for AKM, such risk is eliminated; (D) Ransomware for PKI is also is always a risk, but for AKM, such risk is eliminated or disabled because in an AKM system, humans cannot alter the security protocols; and (E) In connection with a quantum attack, PKI systems remain vulnerable but quantum attack on AKM systems is statistically improbable as discussed later.

FIGS. 1A and 1B compare PKI with an AKM system on a technical level (FIG. 1A is the universal PKI vs. AKM (asset key management) comparison and a data in-flight comparison and FIG. 1B is the data-at-rest and data-in-use comparison). In the Data in Use chart section of FIG. 1B, the "Up Arrow" indicates a higher risk of a malware event, a lateral movement event, an attack on command-and-control and a software supply chain attack.

As an overview, AKM protection of data in-flight or in-transit is achieved in the following manner: 1) One-Time Provisioning (Set & Forget) at initialization or provisioning of the system or onboarding of the component (data stores, processors, applications and other digital or computative devices); 2) All security credentials are embedded within the endpoints (typically at edge node end points) in a security enclave; 3) Security Relationships are multipoint, end-to-end; 4) Security Relationships can overlap, hence, the same device can participate in multiple security relationships (see FIG. 6A, Venn diagram); and 5) Security Relationships can be "application specific" thus, allowing for delineation according to functionality, even within the same physical device. Sometimes these security relationships can be viewed as "containers." Data in-transit is generally communications between the network manager NMM and the security credentialed edge nodes. Data at-rest is stored data in respective edge nodes or in computative devices associated with the subject edge node.

FIG. 2A diagrammatically shows a high-level AKM protection of systems for data-at-rest. In FIG. 2A, digital signatures for the computative device are keyed-hashing message authentication code (HMAC) which HMACs are periodically and continuously, updated. As a result, the AKM system and method authenticates and secures both the device, system and the associated released images. In FIG. 2A, electronic image A1 12 has an A1 asset tag 14 (explained later) associated with image A1. Each subsystem has a GUID 16. The GUID is a 128-bit text string that represents an identification (ID) for image A1. Each device subsystem has some type of processor or processing unit 18 (CPU), a data storage component, and network interface modules. The GPU (graphics processing unit) initially handles electronic image A1 through the AKM asset security process.

For data at-rest, the security credentials are stored in edge node security enclaves and the network manager NMM maintains copies of these credentials. However, the security credentials have a dual hash. A portion of the dual hash is the SDS, or synchronized data set establishing a defined security group, and a second portion of the dual hash is an asset-based hash of each respective edge node. This asset based hash is unique to each asset in the computative system.

FIG. 2A diagrammatically illustrates an AKM key management security credential 19 for electronic file image A1 (FIC-A1) and a security enclave 20. The D1 operating on a copy of the image A1's GUID (the GUID being assigned, in this case, by the manufacturer) and the image A1 asset tag. The secure data enclave in FIG. 2A is labeled D1 Secure Enclave which embodies the key management security credential for electronic file image A1 (FIC-A1). The D1 security enclave operates on a copy of the image A1's GUID (the GUID being assigned, in this case, by the manufacturer) and the image A1 asset tag. The result being that the D1 Security Enclave carries a unique electronic marker which no other device possesses. Key management security credentials are described later herein.

FIG. 2B diagrammatically shows another AKM protection of systems for data-at-rest. In FIG. 2B, digital signatures for the computative device are keyed-hash HMACs 32 (hash message authentication codes). The AKM system and method authenticates and secures both the device 11, the system and the associated firmware or software release images (the release date of the firmware/software in hashed and represented in the HMAC 30). In FIG. 2B, electronic image A1 has an A1 asset tag. The edge node hardware or computative device has a Physically Unclonable Function (PUF) 21 (see also FIG. 2A) as the secure enclave 20. The edge node has some type of processor (maybe a CPU or microprocessor), a data storage component for the PUF, memory for the processor, and network interface modules. The GPU 13 initially handles electronic image A1 12 through the AKM asset security process. The secure data enclave in FIG. 2B is labeled D1 Secure Data Enclave 20 embodies and stores the key management security credential for the entire system, including electronic image (EI) A1. EI Image A1 may be an image of all memory in Edge Node D1 (this all-memory image provides a data security system for data at-rest). At initial provisioning, the EI Image is mainly basic operational program(s) and a data store image. The D1 Security Enclave 20 operates on a copy of the image A1 Asset Tag. Earlier, the processor obtains a HMAC of the EI Image A1 coupled with A1 Asset Tag. The result being that the D1 Security Enclave carries a unique electronic marker which no other device in the system possesses.

In a general manner, the method secures data at-rest by providing the network manager (NMM) with an organized data structure, which may include an edge node and a secure enclave. As described above (and later), the HMAC for one node (a processor, memory and secure data enclave) is unique and different than the HMAC for another node, due to potentially different GUIDs, different firmware storage time and configurations, and different data storage times and configuration of firmware and memory-stored software. Node HMACS are stored in respective enclaves. To designate a singular data security group, the NMM applies a hash function to the NM HMAC and each node's HMAC in the security group to obtain a security data set (SDSet) or a synchronized data set (SDS). The data at-rest is secured because communications is blocked unless the message packet includes the designated node's HMAC and the security group's SDS or SDSet.

Figure 3:
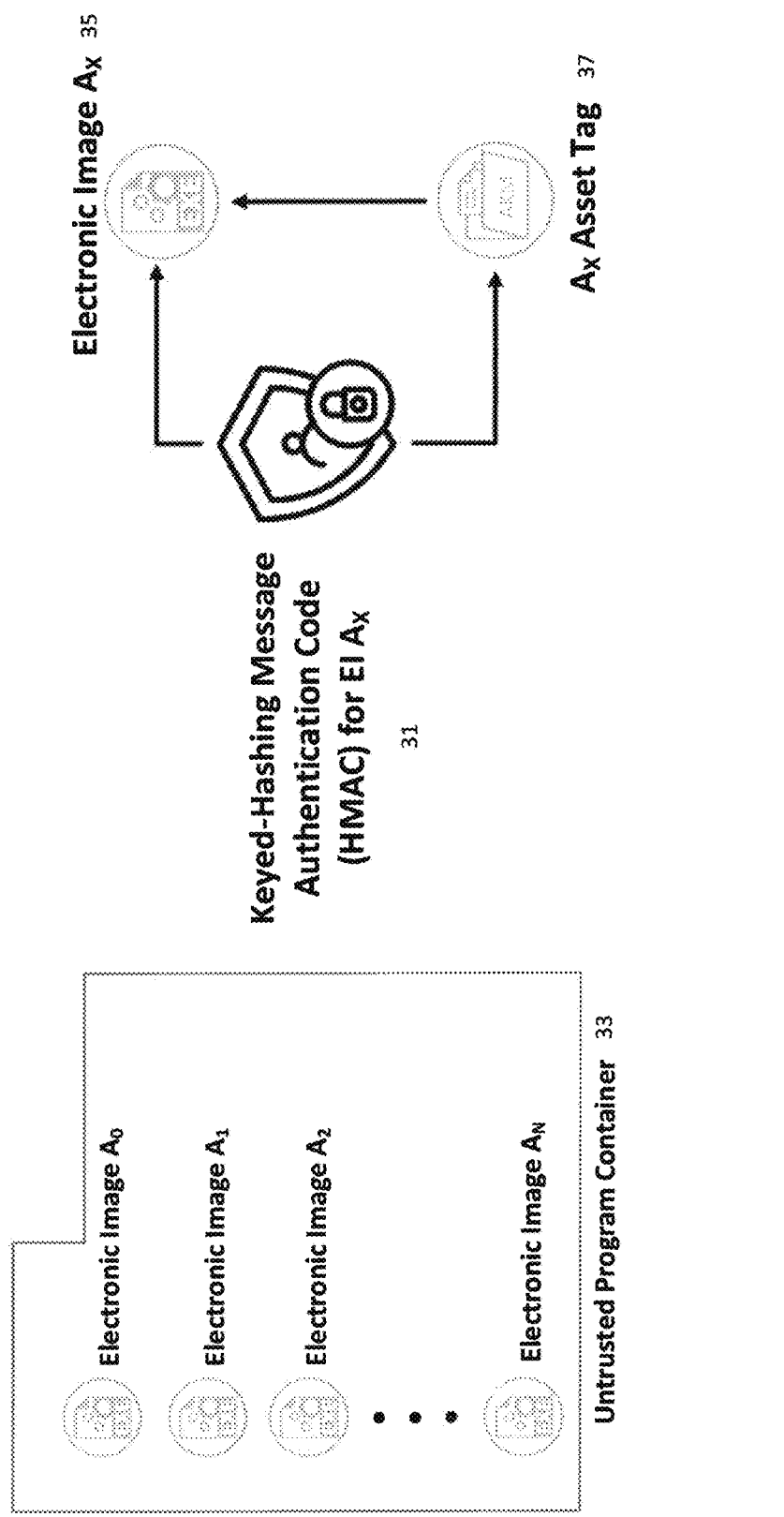
FIG. 3 diagrammatically illustrates a high-level AKM protection of systems for data in-use or in-operation wherein the digital signatures, that is, the keyed-hashing message authentication codes (HMAC), are used to identify and authenticate trusted programs or applications.

FIG. 3 diagrammatically shows a high-level AKM protection of systems for data in-use or in-operation. In FIG. 3, digital signatures, that is, the keyed-hashing message authentication codes (HMAC) 31, are used to identify and authenticate trusted programs or applications. These digital signatures are discussed later. Programs remain isolated (as shown in the untrusted program container 33 on the left-side of FIG. 3 with electronic images A1, A2, A3 through An), and unable to execute on security credentialed image Ax 35, until the program or programs are automatically or manually removed from the untrusted program container module. The short-form process on the right of FIG. 3 indicates that the HMAC for electronic image (EI Ax) is hash-tag enmeshed with the Ax Asset AKM tag 37. The result being an HMAC for EI Ax.

Based upon an analysis of the inventive systems and methods, the technical readiness level (TRL) for the AKM system and method (TRL 9 being is the highest) is: (i) for data in-flight or in-transit, TRL 8; (ii) for data at-rest or in storage, TRL 7; (iii) for data in-use, TRL 5; and, (iv) for automated network detection of adverse event, response, and recovery, TRL 4.

Figure 4:
FIG. 4 diagrammatically shows a high-level technology stack with a Network Management Module (NMM); a Transport Security Layer; an Asset Integrity Management (AIM) (which may be bypassed if AIM is not required); a Key Management System (KMS); and an AKM Security Relationship (ASR) (an AKM is an asset key management system or protocol).

FIG. 4 diagrammatically shows a high-level technology stack with a Network Management Gateway Module 40 (NMM or AMG), a Transport Security Layer 42, an Asset Integrity Management 44 (AIM) (which may be bypassed if AIM is not required), a Key Management System (KMS) 46 and Security Relationship 48 (ASR).

The AKM provisioning process and method creates synchronized AKM Security Relationships (ASRs) using a multi-level cryptographic virtualization model to structure AKM-enabled digital assets into functionally (that is, to contextually operate as expected) defined security relationships. Every AKM digital asset (representing both physical and virtual assets) is assigned a unique AKM identifier and can participate in unlimited concurrent security relationships. Each ASR has unique end-to-end security credentials, policy-based rules, and distributed ledger, and operates autonomously and is 100% isolated from every other ASR, as well as the network hardware (and software) over which it transits, resulting in a virtualized multipoint-to-multipoint communications security mesh that is designed for IoT (internet of things) and AI (artificial intelligent) systems. The ASRs for multi-controlled assets all have different, unique ASRs.

An AKM Asset security credential is the digital twin of a physical or virtual asset, which can be defined as a physical device, a virtual person, an electronic image or file, or some organizational set of assets (for example, a group of AKM assets forming a security subsystem). Any person (virtually represented), any file, any system, any process, any APP or service, any network, and any device may be an AKM asset carrying a unique security credential. As examples, see the Asset Tag Device Table and the Asset Tag for Electronic Image (EI) Tables 1 and 2 set forth later. The asset tags and asset tags for EI form unique digital signatures for (a) computative devices and (b) computative devices linked to electronic data stores (represented by Eis).

Diagrammatically, as shown in FIG. 4, the AKM system is a technology stack. The first layer in the stack (the layer near or at the data, digital or computative device level) is the AKM Security Relationship (ASR) concept that is the basis for the mechanics for how the AKM Key Management System (KMS) operates. An ASR security group is nothing more than a group of two or more nodes that together form a secure cryptographic relationship.

Key attributes of what constitutes an ASR security group includes, but is not limited to, the following features: 1) All nodes within an ASR share group (Sec-group) share a common set of security credentials. All nodes within a security relationship are known in advance; 2) Security Credentials (which are maintained within a data structure called, the Synchronized Data Set (SDS)) are continually refreshed, communication session-by-session, and do so in unison with the other nodes within the same ASR Sec-group. These are sessional-based SDS security data. 3) All nodes within a security relationship are pre-programmed by a trusted source (the NMM) as part of the instantiation process for that relationship; 4) All nodes have full knowledge of the other nodes within its security relationship via the SDS security data (thus enabling each node to detect imposters if need be); 5) Each ASR is unique and shares nothing in common with other ASRs, even other ASRs on the same nodes or set of nodes or Sec-group. This implies that ASRs provide virtual security groups, not physical security groups, meaning, different processes on the same device may have different ASRs. This further implies that if somehow one ASR was breached, the breach would automatically be self-contained, because it would share nothing in common with the other ASRs. All nodes internally generate their own next set of security credentials without exchanging any information with any of the other nodes; 6) All nodes within the same security relationship maintain synchronization with all of the other nodes within the same security relationship so that communication within the ASR Security Relationship (Sec-group) can continue unabated; 7) ASRs form end-to-end virtual security meshes, thus, enabling all nodes to communicate with each other via a virtual broadcast architecture; 8) The methodology used to create the next set of security credentials includes a mechanism that guarantees uniqueness of security credentials across sessions; and 9) In the event that any node fails to properly synchronize with the others in the ASR Security Relationship Sec-group, the integrity of the security relationship itself continues as long as at least two nodes remain in communication with each other, thus, eliminating the possibility of a single point of failure. The resultant algorithm yields a process in which synchronization is maintained without significant overhead and mechanisms are in place for resynchronizing AKM nodes in the event of a loss of synch by one or more nodes.

ASR security credentials have perfect forward secrecy (sometimes referred to as PFS). Since the "next session security credentials calculation" methodology is a one-way function, even if a breach occurred earlier (that is, monitored or recorded by bad actors) prior to the then-engaged ASR communication traffic, a renewed or current security breach would not enable bad actors to determine, from the previous compromised security ASR credentials, the then-implemented ASR credentials. That is, the prior, recorded communication would remain secure and the then-current ASR communication would not be compromised.

The ASR security relationships are peer to peer, multi-point communication systems. AKM secure communications is able to provide true, multi-point, end-to-end secure communication, because it uses a decentralized, distributed architecture for maintaining and storing security credentials. When nodes communicate with each other, they use the same set of SDS credentials, which is how the AKM key management systems (KMS) supports multipoint end-to-end encryption. Multi-point end-to-end security is provided because the asset tag HMAC for each node (a node being a modular set of computing components) is always unique to that node. Each node's HMAC is stored in the NMM data structure (discussed later). ASR Security Credentials are refreshed automatically and autonomously every communication session. Thus, the AKM system is different than PKI (private key infrastructure) systems which, in a closed internet of things (IoT), may never refresh PKI credentials or, at best, refresh credentials every 9-12 months.

The AKM Security Relationship or ASR is one of several foundational elements of the present invention. An AKM Provisioning Security Relationship for a physical device is used for two things: 1) It is used to establish an AKM connection with the AKM infrastructure. This is the relationship that connects the physical device to the root-of-trust AKM network; and 2) It is used to manage the aggregation of components comprising a physical device asset, including keys, seeds, and vectors used for both the encryption and digital signature algorithms ensuring the security and authentication of the physical device's digital twin and the virtual assets (i.e., electronic images) belonging to the physical device. The manifestation of the Physical Device's Provisioning ASR is its Synchronized Data Set (SDS). See, for example FIGS. 8, 9A, 9B, 9C, and 10.

Some elements within the SDS (synchronized data set) of the provisioning ASR for the physical device include, but are not limited to, the following: 1) AKM Security Relationship Identifier; 2) Current Session Security Credentials; 3) Next Session Security Credentials; 4) Fallback Session Security Credentials; 5) Failsafe Session Security Credentials; 6) Arbiter Mode Session Credentials (if applicable); and 7) Ordered List of AKM Component (i.e., electronic image) Identifiers for Physical Device and Container Nodes. ASR elements 3, 4, 5, and 6 are discussed later.

Figure 5:
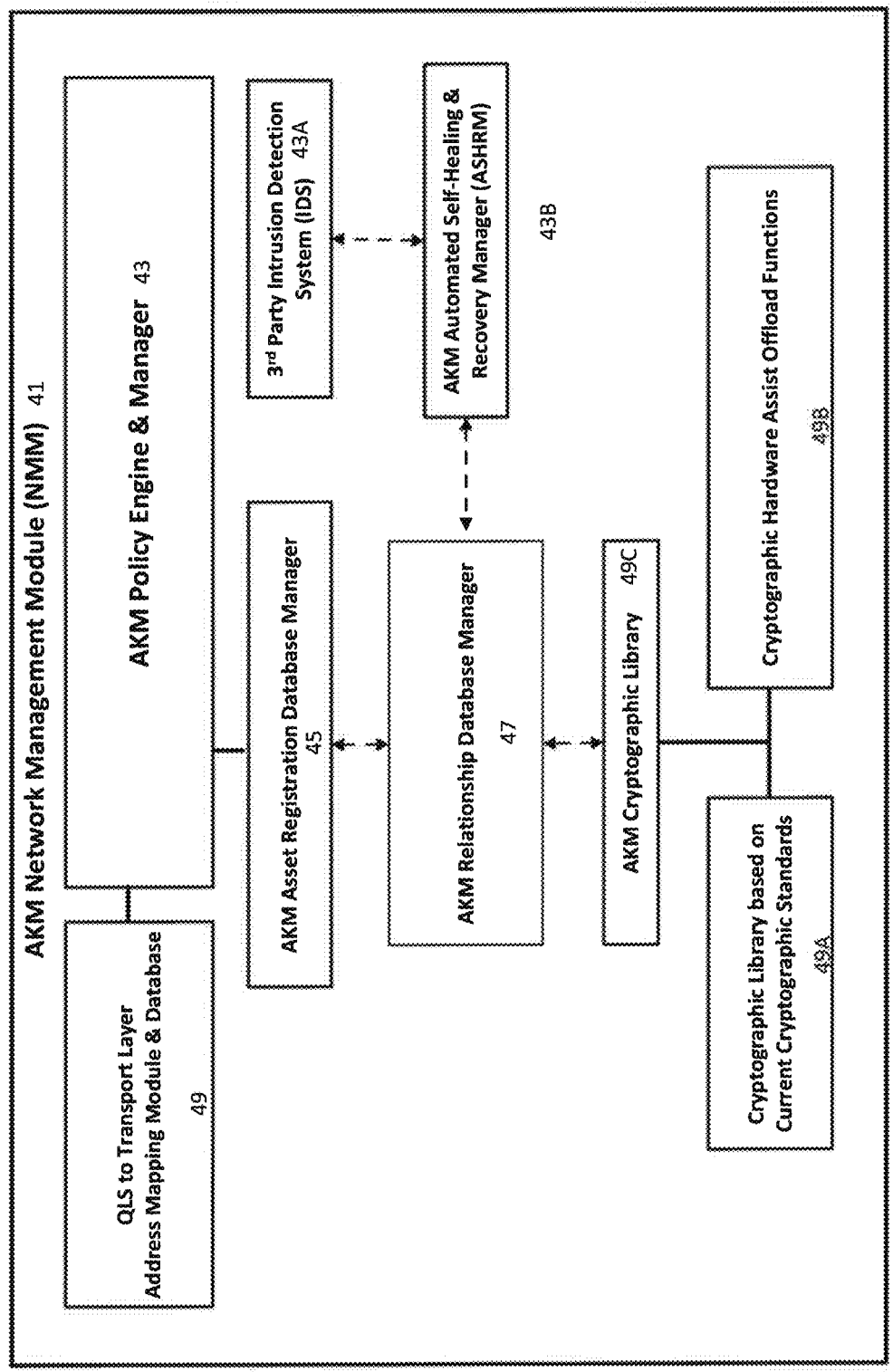
FIG. 5 diagrammatically shows a high-level AKM Network Management Module (NMM) which, in some embodiments, is the central repository or controller for the AKM system. In a simple installation, a designated edge node may operate as the network management module. The NMM edge node is a proxy for the NMM.

FIG. 5 diagrammatically shows a high-level AKM Network Management Module 41 (NMM). The NMM in a preferred embodiment is the central repository or controller for the AKM system. In some embodiments, is the central repository or controller for the AKM system. In a very simple installation, a designated edge node may operate as the network management module. The NMM edge node is a proxy for the NMM.

Figure 6A:
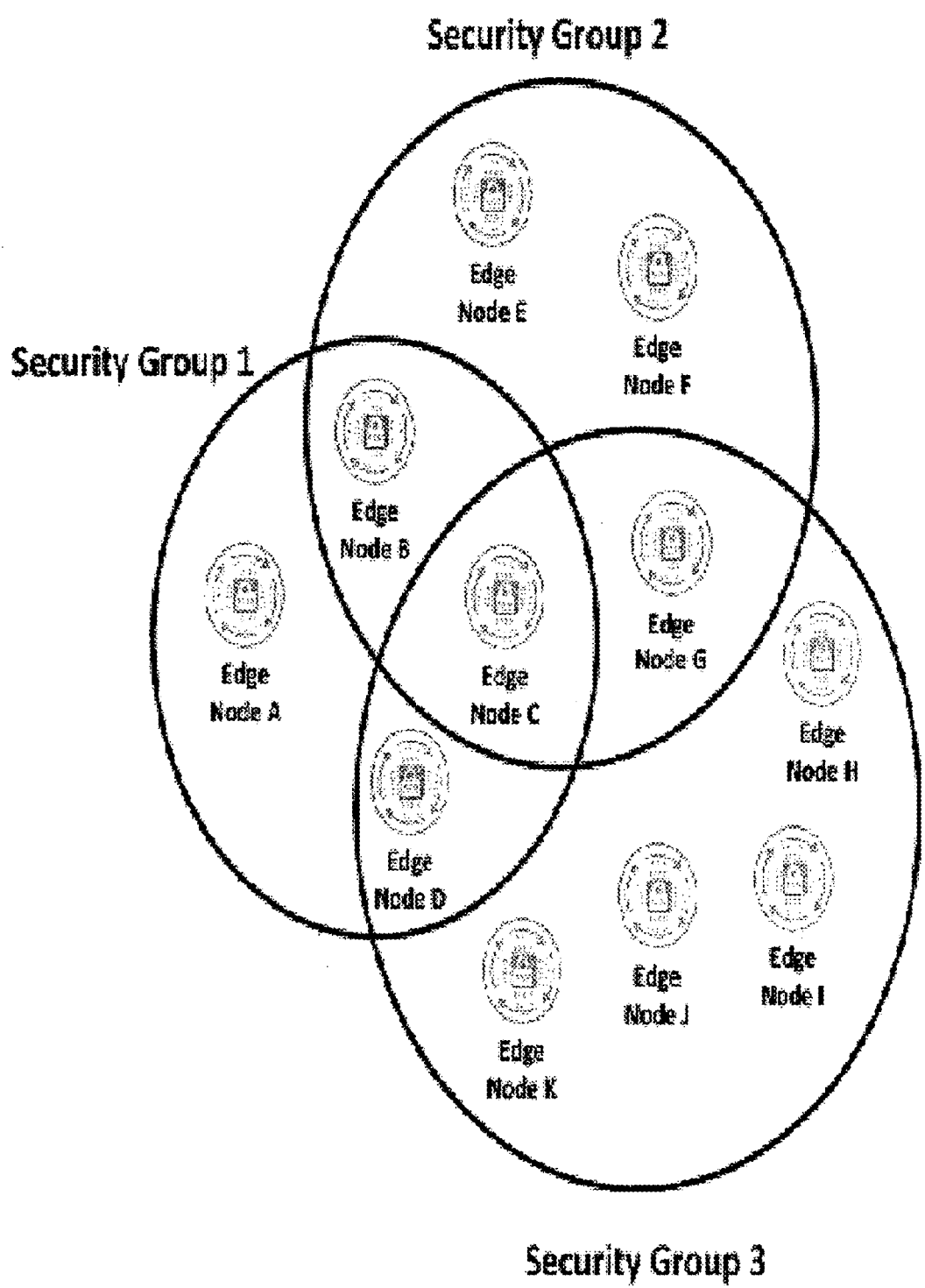
FIG. 6A diagrammatically shows edge nodes A through K with overlapping ASR Sec-groups 1, 2 and 3, in a Venn diagram form (an ASR is an AKM Security Relationship) wherein cabined, successful communication between edge nodes in the same ASR group involves, at a high level, matching digital signatures.

FIG. 6A diagrammatically shows edge nodes A through K with overlapping ASR Sec-groups 1, 2 and 3, in a Venn diagram form. FIGS. 5 and 6A are discussed concurrently herein. Communication between edge nodes involves matching digital signatures.

The NMM in FIG. 5 has the following functionalities: 1) To provide provisioning and maintenance capabilities for AKM Security Relationships 43 (ASRs to act as a proxy for the Factory Backend Configuration Database Server (FBCS)); 2) To monitor the ASRs within their network; 3) To collect and analyze analytics derived from the individual edge node devices within its AKM network domain; 4) To collect other related analytics derived by an Intrusion Detection System 43A (IDS) and using both those analytics and the ones derived directly from the AKM Edge Nodes in order to make intuitive decisions regarding potential breaches and/or attempted breaches and to make these decisions in accordance with predefined policy; and 5) To detect, respond and recover, as defined by predefined policy to breaches and attempted breaches. The NMM may have additional or supplementary functions to accomplish interactions discussed below.

The AKM NMM provisions, monitors, and oversees AKM Edge Nodes and ASR Security Relationships (see FIGS. 5 and 6A). In one embodiment, these NMM functions are provided via AKM Software Applets, with an optional AKM "Java Card" Secure Element (software or hardware, acting as the NMM edge network module, with a secure enclave), within an edge node hardware device. The NMM AKM edge node secure element may be implemented in standalone pizza box or server blade (as a form-factor insert) and alternatively, may be integrated into customer hardware module for custom integrations. In some cases, a fob, dongle, memory, or thumb drive may be used as a secure data store enclave in the edge node. The NMM also autonomously re-syncs the edge nodes in the suspect security group having the same ASR (each edge node including associated hardware, processor) and, in the then-un synced ASR security group, uses the provisioning security credentials (Re-covery Manager 43B). The re-sync using provisioning security credentials occurs autonomously when all reset functions fails.

The AKM policy engine and manager 43 enables a customizable, table-driven Context Free, Finite State Machine (FSM) (see, for example, FIG. 11), that determines user defined policies for creating, maintaining, and managing AKM relationships. It also interfaces into the AKM Asset Registration Database Manager 45 in the NMM and the AKM Relationship Database Manager 47 whenever it needs specific information for either AKM assets or relationships. The AKM Relationship Database Manager maintains the ASR relationship database in the NMM, including both provisioning relationships that also enable the gathering of analytics from its member nodes. The query language (QLS) to Transport Layer 49 addresses mapping a module and the relevant database. Examples of the FSM and QLS are discussed later. The QLS Protocol Processing performs: (1) frame header processing; (2) digital signature processing; and (3) encryption processing. The AKM Cryptographic Library 49C in the NMM functions include, within this library, AKM specific functionality that cannot be found within existing NIST/FIPS compliant libraries and/or HW (hardware) assist offload engines. The Cryptographic Library 49A is based on current cryptographic standards, for example, from the NIST/FIPS compliant library and the Cryptographic Hardware HW Assist Offload Functions 49B are cryptographic functionality resident to the hardware platform.

Figure 6B:
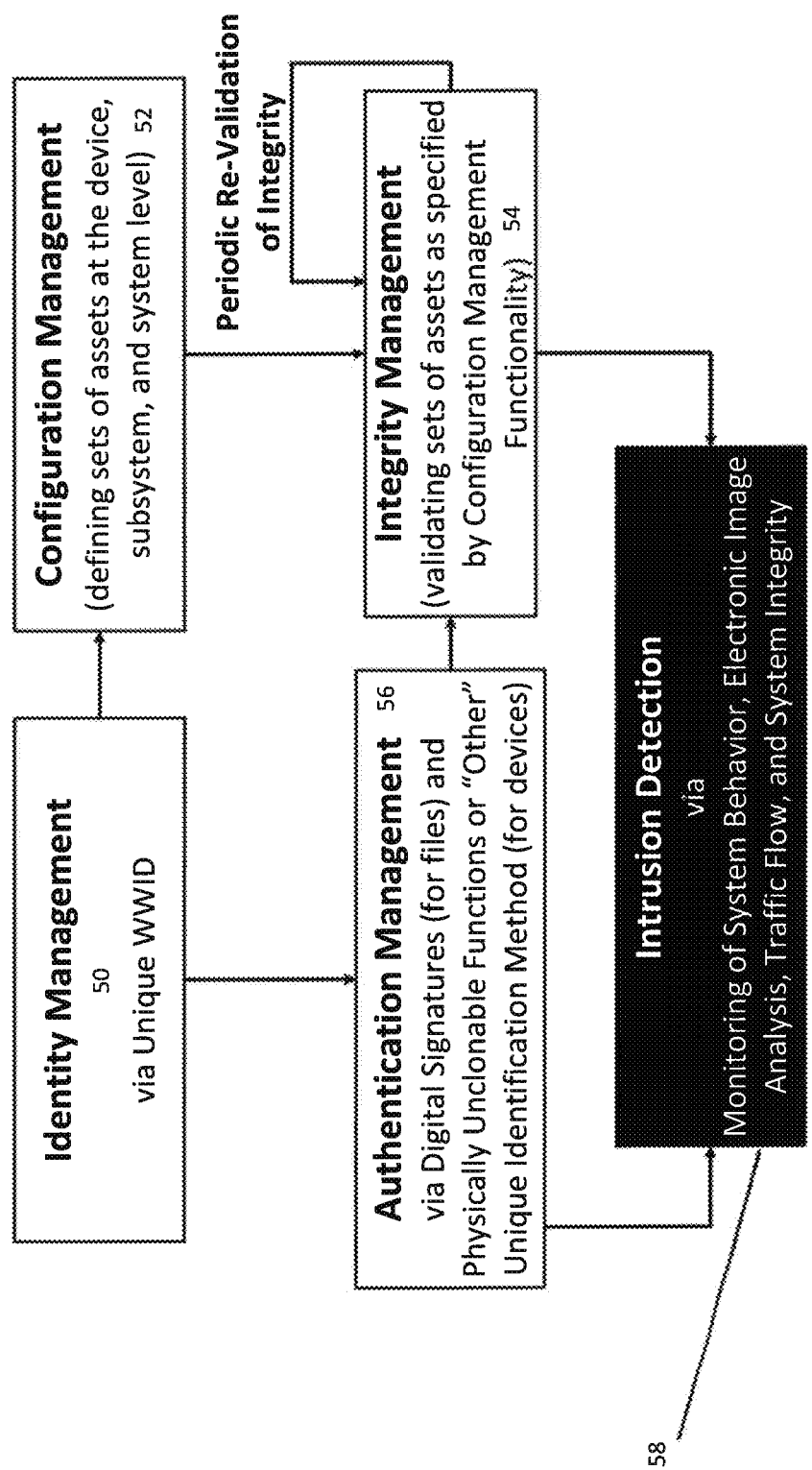
FIG. 6B diagrammatically shows high level functional aspects of the AKM system and protocol, typically managed by the Network Management Module (NMM) wherein the NMM establishes identity management for each computative device, the device's unique configuration in the ASR and NMM which enables authentication management and integrity management.

FIG. 6B diagrammatically shows high level functional aspects of the AKM system and protocol, typically managed by the Network Management Module (NMM). The NMM establishes an identity management 50 for each computative device in the AKM system and further the device's unique configuration management 52 in the NMM. The result being that the NMM or its edge node proxy can engage a robust authentication management 56 and concurrently enable integrity management 54. This integrity management is periodically re-validated with then-current communication sessions between the NMM and the targeted device. Additionally, the NMM enables intrusion detection 58 by monitoring successful comm sessions with devices in the ASR relationship. WWID is the hardware assigned code for the device, sometimes a GUID or an HD provisioning relationship identifier.

The inventive system and method also includes an AKM Asset Integrity Management add-on that adheres to CENELEC 50701 and ISA/IEC 62443. AIM autonomously monitors the integrity of the entire system and runs for perpetuity with minimal overhead. AIM is designed to provide a methodology that for a given system, to securely identify, and verify (hence authenticate): 1) Hardware assets (embedded devices); 2) Virtual assets (electronic images) residing within each hardware asset (i e the embedded devices and its firmware, software, and data files; 3) Subsystems, consisting of individual hardware assets; and 4) Complete systems, consisting of a hierarchical collection of subsystems (e.g., an automotive vehicle, train, plane, manufacturing robot, etc.). AIM protocols and capabilities are applied to systems, subsystems and individual assets from initial creation, through deployment and until end of life. AIM enables identification and tracking of every element of a system within a hierarchical framework (i.e., first identifying at the device level, then the subsystem level, then, if applicable, collections of subsystems, and finally, the entire system).

As an example, one embodiment of the AKM system and method uses a Device Integrity Code (DIC) for computational assets and a File Integrity Code (FIC) for other assets.

Figure 9A:
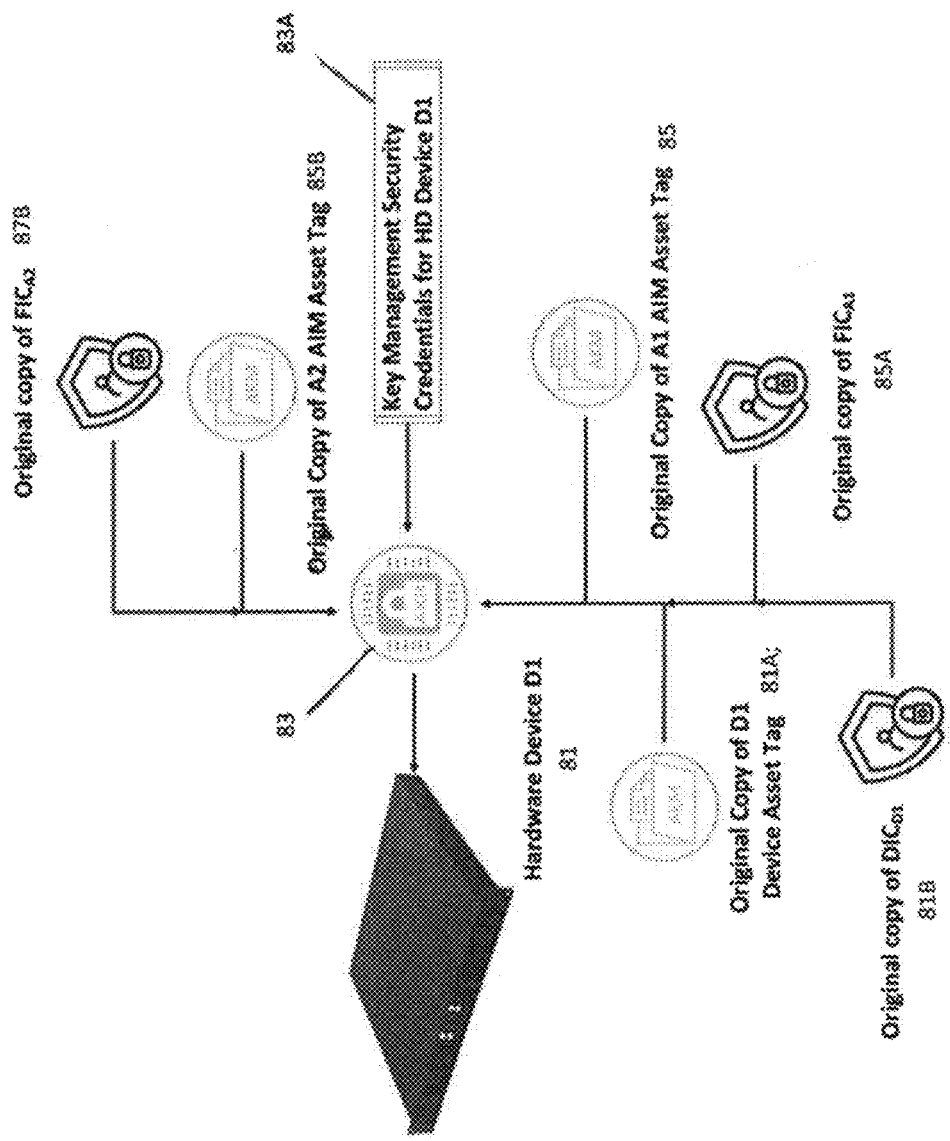
FIGS. 9A, 9B and 9C diagrammatically illustrates an AKM-AIM Device Authentication system-type flow chart.
Figure 9B:
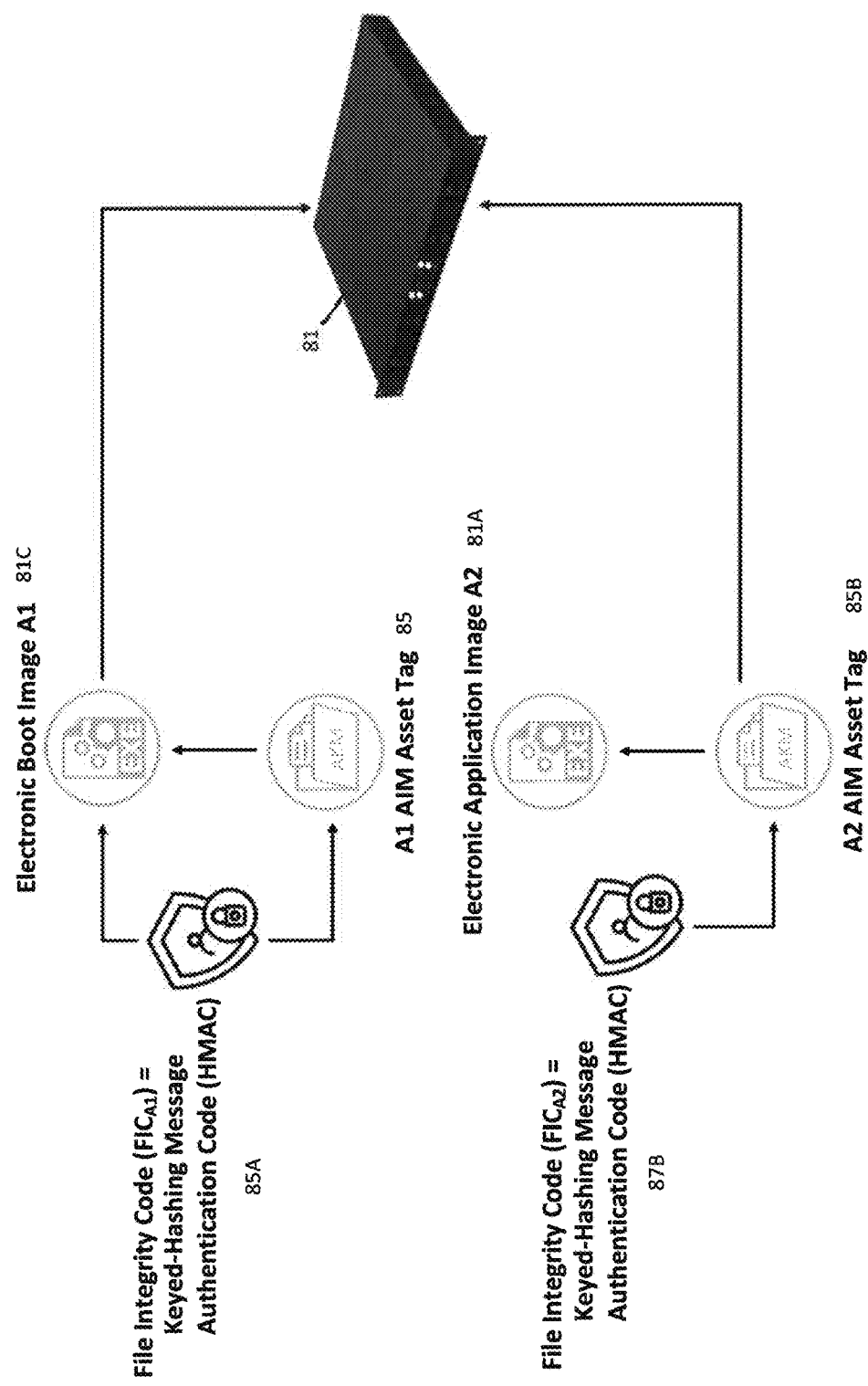
Figure 9C:
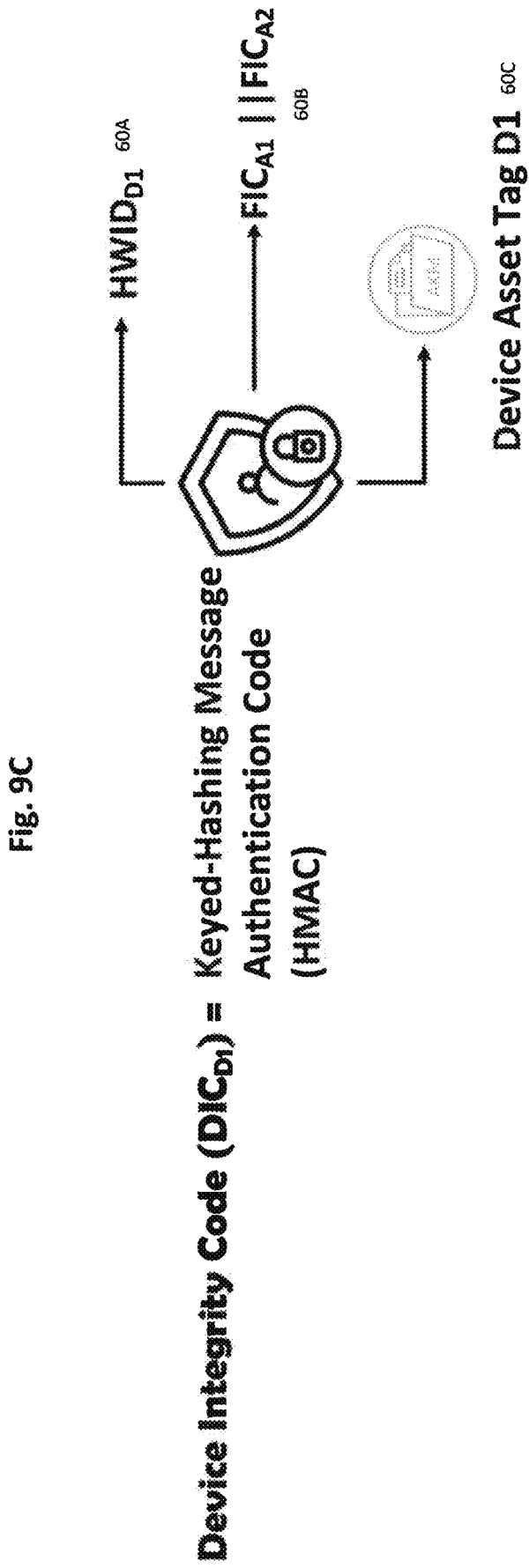
Figure 10:
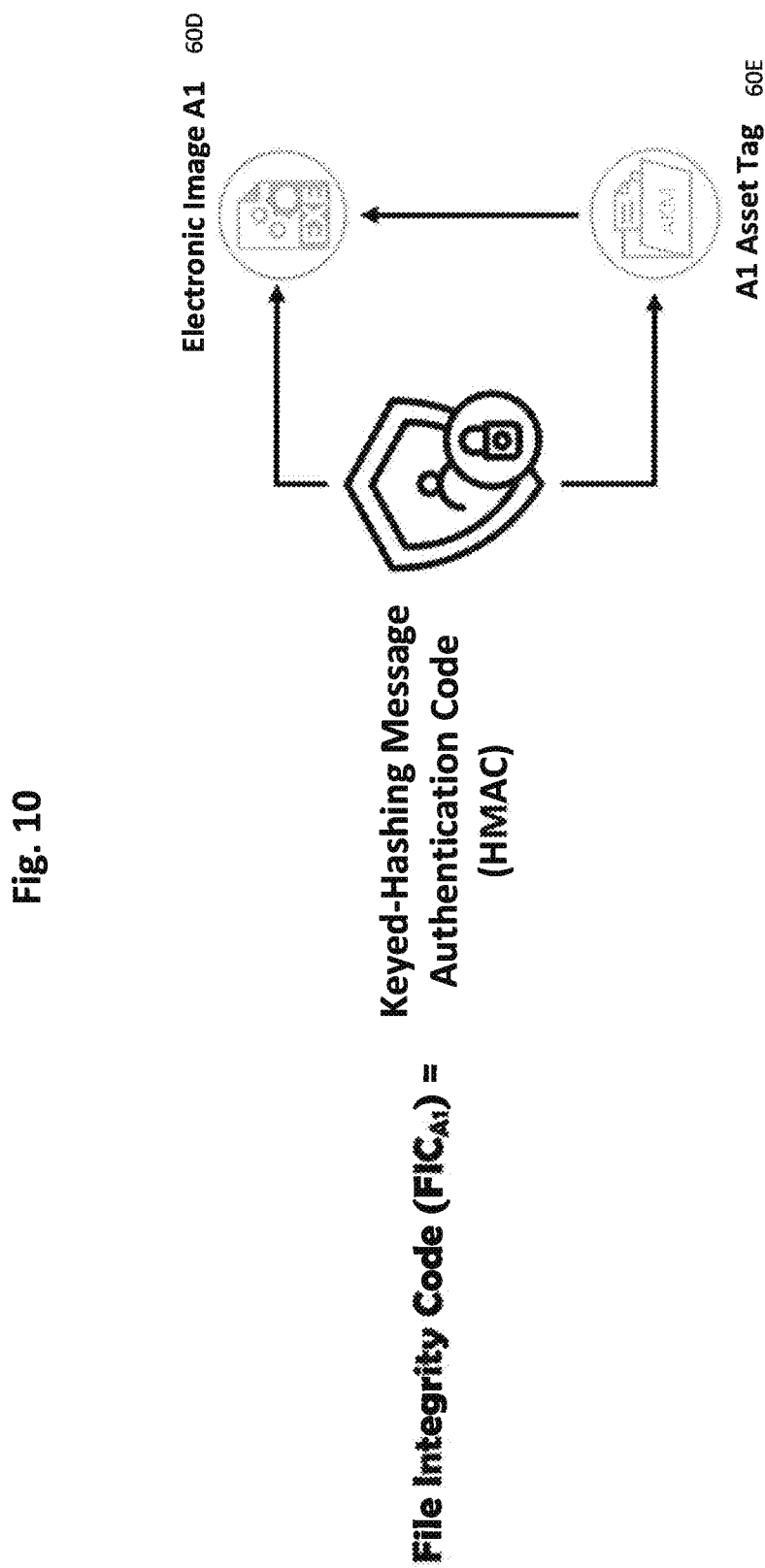
FIG. 10 diagrammatically illustrates a process to produce a File Integrity Code (FIC) wherein the FIC is derived by taking the digital signature of the coupling of an HMAC of the electronic image (EI) asset and the EI's asset tag (see the Asset Tag for Electronic Image Tables 1 and 2).

FIG. 9C diagrammatically shows the DIC and FIG. 10 diagrammatically illustrates a process to produce a File Integrity Code (FIC). The Device Integrity Code (DIC), in one embodiment, is a 256 bit SHA256 resultant HMAC run over an aggregate of information directly associated with a device 60A (hardware HWID), including all of the electronic image (EI) IMGx components 60B that are specified to be part of a device by the Backend Server's (FBCS) configuration management system, as well as the SDS of the Device.

As a further explanation, the Device Integrity Code (DIC) is derived by taking the digital signature of the coupling of an HMAC of the Device's Asset Tag (which includes, amongst other things, the HW GUID from the chipset manufacturer (HW referring to "hardware")) and the Device SDS, plus an aggregation of the File Integrity Codes (FIC) of all of the electronic images (IMG1, IMG2, . . . IMGx) comprising the firmware release for the specific device. The mathematical function below specifies the calculation for a DIC. DIC is equal to:

$$HMAC(SHA(AssetTagDevice)\|SHA(SDSDevice)\|FICIMG1\|FICIMGx\ldots,HMAC\text{-}SECRETDIC) \quad \text{DIC Equation A}$$

Wherein AssetTagDevice represents the Asset Tag of the Device 60C; SHA (SDSDevice) represents the Synchronized Data Set (SDS) of the device in the system (or in the sub-system); FICIMGx represents the File Integrity Code of Image X; and HMAC-SECRETDIC is the secret key used during the first pass of the HMAC process (a/k/a provisioning relationship identifier, see Asset Tag Device Table). In one sense, the provisioning relationship identifier may be a network manager assigned data code, uniquely assigned to the Asset. Another methodology is the NMM generating the HMAC-SECRETDIC a/k/a provisioning relationship identifier including a time stamp at provisioning time. Since different Assets cannot be simultaneously provisioned, each Asset would have a unique HMAC-SECRETDIC a/k/a provisioning relationship identifier. Values unique to individual devices will be used to validate the authenticity of an individual device. If the value on the device does not equal the expected value, then the hardware can be considered to be compromised (and not the device it claims to be). By including the Device SDS as part of the calculation of the DIC, this ensures the integrity of the Device SDS is implicitly verified by other devices within the same subsystem (as part of the SSIC).

Alternate configurations of the DIC may be employed as presented in the following formula, wherein DIC is equal to:

$$HMAC(HWID\|SHA(SDS\text{-}subsystem)\|SHA(IMG.1)\|SHA(IMG.2)\ldots,HMAC\text{-}Secret\text{-}DIC) \quad \text{DIC Equation B}$$

Wherein: the SDS-subsystem (alternatively SDS-device) represents the SDS for either the subject device or the ASR-Subsystem relationship. By including the Device SDS as part of the calculation of the DIC, this ensures the integrity of the Device SDS is implicitly verified by other devices within the same subsystem (as part of the SSIC).

Another configuration of the DIC with Asset Tags for each computative device follows. In this embodiment, the DIC is derived by taking the digital signature of the coupling of an HMAC of the Device's Asset Tag (which includes, amongst other things, the HW GUID from the chipset manufacturer) and an aggregation of the File Integrity Codes (FICs) of all electronic images (EI) comprising the firmware release for the specific device. The mathematical function below specifies the calculation.

$$HMAC(SHA(AssetTag\text{-}Device)\|FIC\text{-}IMG.1\|FIC\text{-}IMG.x\ldots,HMAC\text{-}Secret\text{-}DIC) \quad \text{DIC Equation C}$$

In this iteration, AssetTag-Device represents the Asset Tag of the Device, FIC-IMG.x represents the File Integrity Code of EI Image X, and HMAC-Secret-DIC is the secret key used during the first pass of the HMAC process during provisioning. Values unique to individual devices will be used to validate the authenticity of an individual device. If the value on the device does not equal the expected value, then the hardware (HW) can be considered to be compromised (and not the device it claims to be).

A Synchronized Data Set or SDS-subsystem, represents the SDS for the local Subsystem relationship. The SDS-device is the same as the SDS-system. IMG-n, that is, IMG.1 and IMG.2, represents the image for the nth image component, object or file. By including the Device SDS as part of the calculation of the DIC, this ensures that the integrity of the Device SDS is implicitly verified by other devices within the same subsystem (as part of the SSIC).

FIG. 10 diagrammatically illustrates a process to produce a File Integrity Code (FIC). A File Integrity Code (FIC) is derived by taking the digital signature of the coupling of an HMAC of electronic image (EI) asset 60D and the EI's asset tag 60E. See the Asset Tag for Electronic Image Tables 1 and 2 presented later. The FIC utilizes encrypted elements of the EI image A1, its asset tag (A1 Asset Tag), and the digital signature, thus preventing the tampering of the EI image asset. If the decrypted value of the combined electronic image and asset tag do not match the expected value, the electronic image will be considered compromised. In one embodiment, the FIC is the 256 bit SHA256 resultant HMAC run over an aggregate of information directly associated with a device, including the electronic image components and its associated asset tag and maintained as part of the FBCS Backend Server's configuration management system, as well as the SDS of the Device and the encapsulating system and/or subsystem. This FIC is the 256 bit SHA256 resultant HMAC run over an aggregate of information directly associated with a device, including the electronic image components and its associated asset tag. The mathematical function below specifies the calculation for a FIC.

$$FIC=HMAC(SHA(IMGx)\|SHA(AssetTagImg\text{-}x),HMAC\text{-}Secret\text{-}FIC) \quad \text{FIC Equation}$$

In the FIC algorithm, IMG-x represents the Image label, for Image "x" of n images. AssetTagImg-x represents the Asset Tag of Image X. HMAC-Secret-FIC is the secret key used during the first pass of the HAMC process during provisioning. Values unique to individual devices are used to validate the authenticity of an individual device. If the value on the device does not equal the expected value, then the hardware is considered to be compromised (that is, not the device or file it claims to be).

One foundational embodiment of the several embodiments of the present invention is a method of establishing and maintaining secure data communications in a computative system having a network manager (NM) and a first and a second edge node, all communicatively coupled together via to the network. The NM may use a network edge node as a proxy. Thus, a basic embodiment includes two edge nodes, each having a respective processor, data store, and a secure data enclave. In the preferred embodiment the NM also has a processor, data store (database or organized data structure), and a secure data enclave. The method generates and stores, in each computative device a hash message authentication code (HMAC) based upon the respective processor, and at least a portion of the NM data store. Hence, the NM, via its NM edge node, generates and effects the storing, in the corresponding first and second edge node enclaves, first and second unique HMACs based upon the corresponding first and second processors and first and second data stores (the "secret" data elements in the above algorithms). At the initial provisioning time, the NM may assign a unique provisioning id to the Asset. At a security provisioning time (different than the initial provisioning time of each Asset), the NM applies the hash function to the NM HMAC and the first and second HMACs to obtain a security data set (SDSet) (in the foregoing algorithms, referred to as the SDS or SDS-device or SDS-subsys) and stores the SDSet in the NM enclave and the first and second enclaves. This forms the AKM (autonomous key management) Security Relationship (ASR) between the NM and the first and second edge nodes. The above-noted algorithms provide a double hash as security credentials.

Figure 6C:
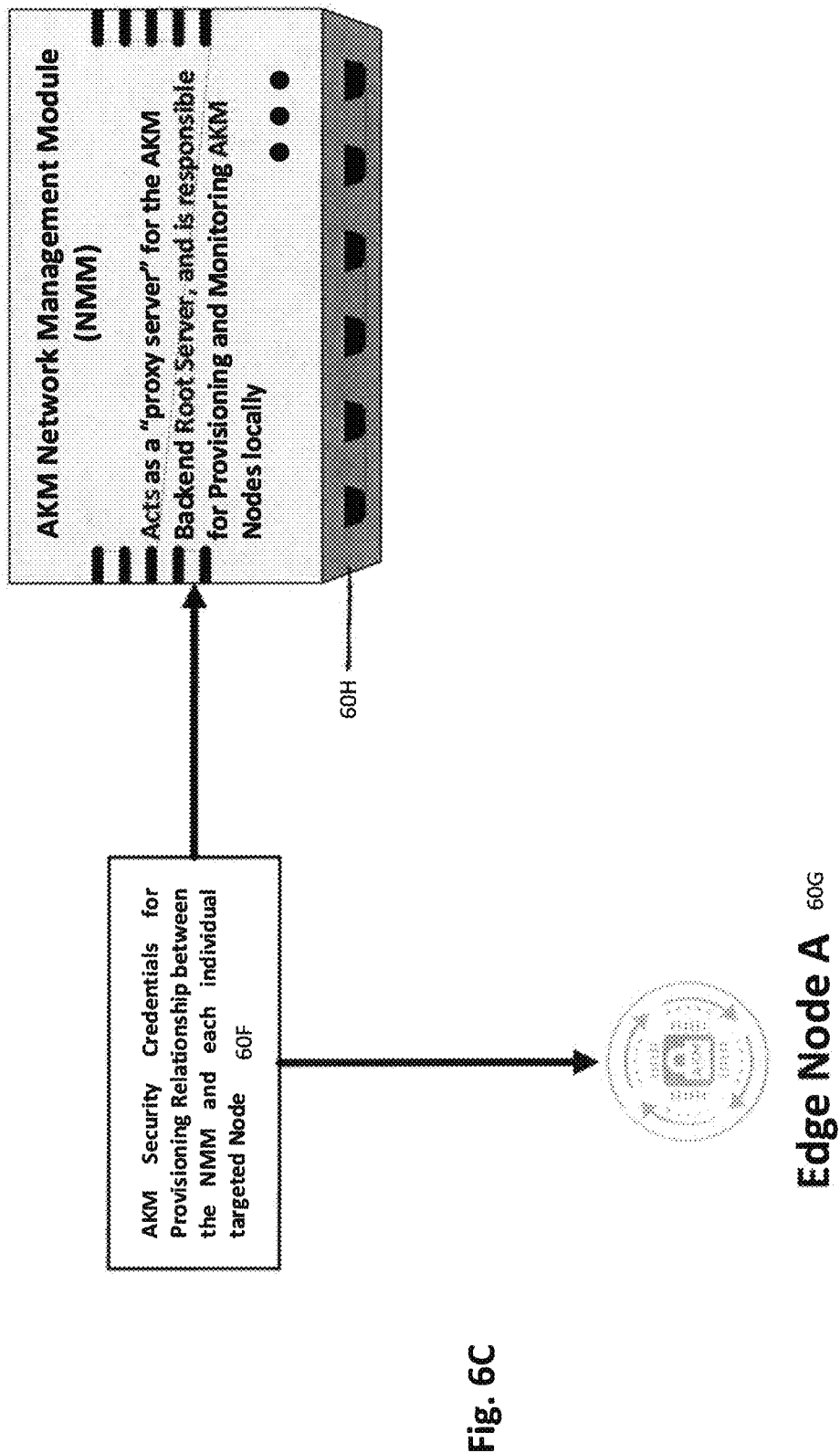
FIG. 6C diagrammatically shows a provisioning AKM Security Relationship (ASR) between Edge Node A and the AKM Network Management Module (NMM) edge network module wherein the provisioning security relationship is a separate management ASR that every AKM asset possesses enabling the FBCS Backend Server or its proxy, the ability to initially configure and/or subsequently modify an AKM asset into/within one or more ASRs.

FIG. 6C diagrammatically shows a provisioning AKM Security Relationship (ASR) 60F between Edge Node A 60G and the AKM Network Management Module 60H (NMM) edge network module. A provisioning security relationship is a separate management AKM Security Relationship (ASR) that every AKM asset possesses. It enables the FBCS Backend Server (the NM) or its proxy (the NM edge node), the ability to initially configure and/or subsequently modify an AKM asset into/within one or more ASRs. An AKM provisioning relationship is always a binary relationship, either a match or a NO match. In this example, a provisioning security relationship is created between the AKM Network Management Module (NMM) and an AKM Edge Node. As used herein the term "provisioning" means the activity of obtaining the equipment and resources the AKM system needs for a particular activity, such as the software includes provisioning, management, and archiving capabilities.

Figure 6D:
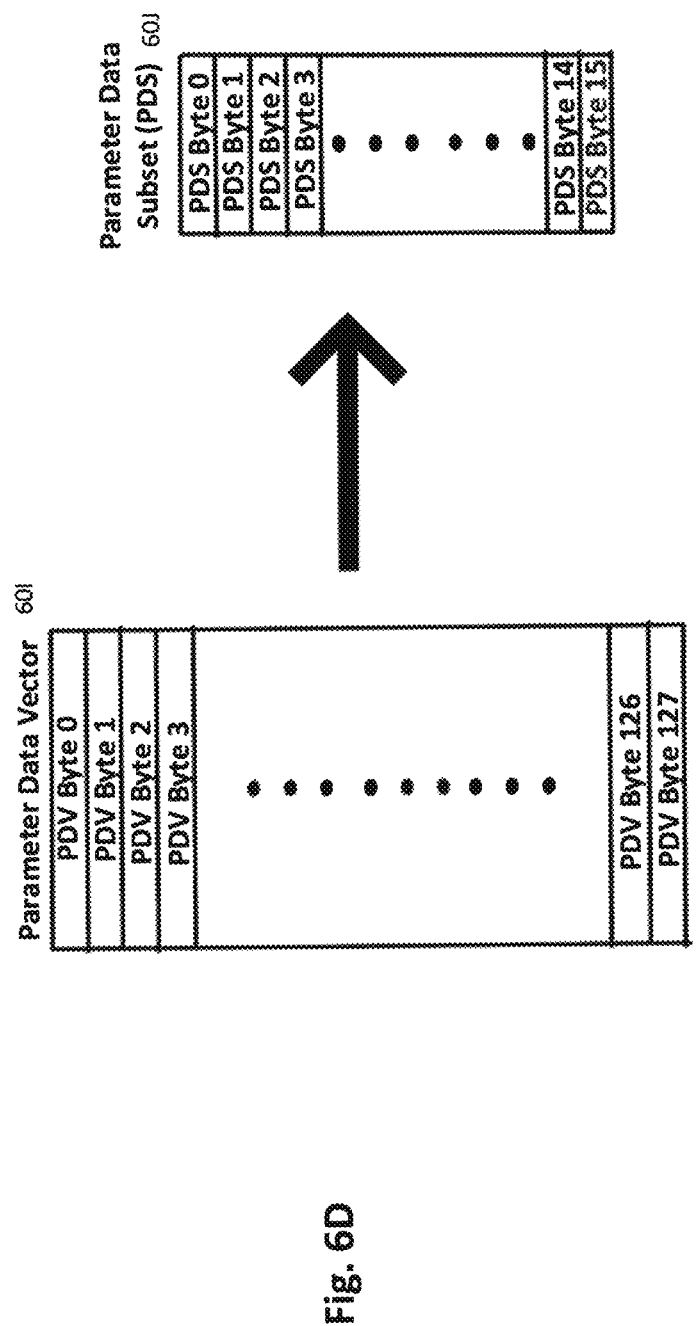
FIG. 6D diagrammatically shows an example of a message packet that is transformed into the data transport AKM Frame Structure of FIG. 7 which operationally is the basis of the AKM Synchronized Data Set (SDS).
Figure 7:
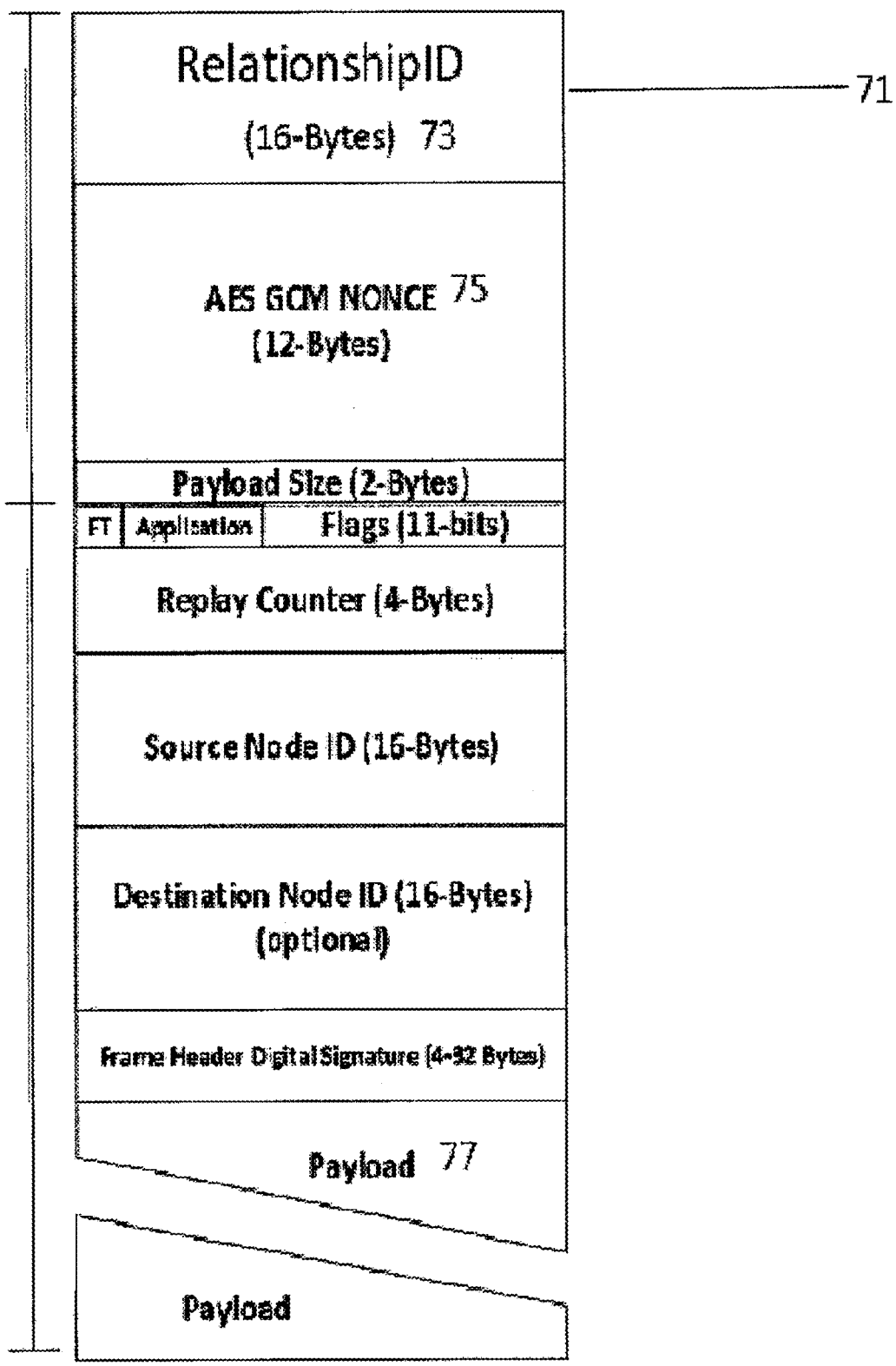
FIG. 7 diagrammatically shows one example of the AKM Frame Structure as a data transport or message with exemplary byte sizes.

FIG. 6D diagrammatically shows an example of a message packet that is transformed into the data transport AKM Frame Structure of FIG. 7 which operationally is the basis of the AKM Synchronized Data Set (SDS). A Parameter Data Vector 60I (PDV) is an implementation specific vector that can be used across all nodes within an AKM Security Relationship (ASR), that, in combination with seed values from an AKM Synchronized Data Set (SDS), is used to create the security credentials for the next session for a specific ASR. There may be a unique PDV per ASR. Further, the size of the PDV can be both implementation specific as well as ASR specific and even communication session specific. It may not be necessary to change the PDV per session for reasons of simplicity. It is believed that changing the PDV per session is both unnecessary and this session-change function could cause an unrecoverable loss of synchronization. As an example, the default size of the PDV is 128-bytes, with each element within the PDV being 1-byte each, so there are 128-values. For example: PDV Byte 0; PDV Byte 1; PDV Byte 2; PDV Byte 3; PDV Byte 4; PDV Byte 5; PDV Byte 6; PDV Byte 7; . . . PDV Byte 127.

The PDV is part of the Synchronized Data Set (SDS). The AKM framework first selects the Parameter Data Subset 60J (PDS) from which the parameters will be used to create Next Session Credentials. One exemplary default for the Parameter Selection Function is the Fisher-Yates Shuffle (also known as the Knuth Shuffle). Other shuffle or randomization functions may be used. A PDS shuffle simply reorganizes the PDV frames in FIG. 6D.

The Synchronized Data Set (SDS) represents the set of credentials for a specific ASR and resides within a secure element or other trust zone. This SDS is a set of values, one per AKM Security Relationship (ASR), which is used to maintain synchronization within the ASR relationship across sessions. The elements within the SDS, include, but are not limited to: 1) Relationship Identifier; 2) Current Session Encryption Key; 3) Current Session Seed Value; 4) Current Session HMAC Key/Secret used for HMAC calculations; 5) Next Session Encryption Key; 6) Next Session Seed Value; 7) Next Session HMAC Key/Secret used for HMAC calculations; 8) Optional Arbiter Session Security Credentials; 9) Fallback Session Security Credentials; 10) Failsafe Session Security Credentials; and 11) AKM protocol addresses of all of the AKM nodes that are part of the same security relationship.

In one embodiment, a System Integrity Code (SSIC) is a 256-bit SHA256, resultant HMAC run over an aggregate of information directly associated with all of the subsystems comprising a system, including the SDS of the System SDS. The precise information for which the HMAC of the system is calculated. One example of a SSIC mathematical function is set forth below.

$$SSIC = HMAC(SHA(SDS\text{-sys}) \| SHA(IC\text{-}1) \| SHA(IC\text{-}2) \| SHA(IC\text{-}x) \ldots, HMAC\text{-Secret-SIC}) \quad \text{SSIC Equation}$$

In this SSIC sample formulation, SDS-sys represents the SDS for the local subsystem (sub-sys) relationship. IC-x represents the Integrity Code used for each of the devices within the relationship. In most cases, the Integrity Code used will be an SSIC, but in instances wherein a device is a lone device at the system level, then the IC used will be the DIC for that lone device. By including the System SDS (SSDS) as part of the calculation of the DIC or the SSIC, this ensures the integrity of the System SDS is implicitly verified by the Back-End server and/or proxy servers.

The difference between prior art ZKA (Zero Knowledge Authentication) and the present AKM system and method is as follows. ZKA enables an untrusted device (i.e., the "Prover") to participate in a ZKA secured relationship by proving a secret without exposing any hidden information about the secret to the other already trusted devices within the relationship. In the ZKA process, the "Prover" only shows that the statement is in fact true, without any opportunity for an attacker to gain access to the secret information because there is NO secret information transmitted. ZKA typically requires an independent 3rd party (i.e., the "Authenticator") that can act as a local authenticator to all participants in the ZKA secured relationship. ZKA is explained in the article entitled "Personal Data Protection in Blockchain with Zero-Knowledge Proof," by S. Capraz, et al., published March 2021.

In contrast, in an AKM system or method, the Authenticator (sometimes called a Verifier) is the Secure Enclave and the secrets are the values used to create the HMAC based digital signature because those HMAC values cannot be tampered with by the host (as they are generated and maintained within the Secure Enclave at the time of provisioning). Hence, the Secure Enclave is the trusted verifier. AKM has an advantage over typical ZKA architectures in that all AKM edge nodes contain a trusted verifier (i.e., the Secure Enclave), which is physically and logically isolated from its host. Thus, even if the host is somehow infected, it would not be able to affect the contents of the secrets within the AKM verifier/secure enclave device. The exemplary AKM Frame Structure provides an algorithmically different data security system as compared to ZKA security systems.

FIG. 7 diagrammatically shows one example of the AKM Frame Structure 71 as a data transport or message. Other frames may be used. The byte sizes in FIG. 7 are only exemplary. The basic or elements of the AKM frame are as follows: a RelationshipID; an AES GCM Nonce; a PayloadSize; Frame Type (FT) Bits; Application data (optional); Flags; Replay Counter; SourceNodeID; DestinationNodeID (optional); FrameHeaderDigitalSignature; and Payload. In the current embodiment of the AKM system and method, the RelationshipID is 16 Bytes; the AES GCM Nonce is 12 Bytes; the PayloadSize is 2 Bytes (the foregoing frame elements are an unencrypted part, from 28 Bytes); the Flags are 11 bits; the Replay Counter is 4 Bytes; the SourceNodeID is 16 Bytes; the optional DestinationNodeID is 16 Bytes; and the FrameHeaderDigitalSignature is 4-32 Bytes. As shown in FIG. 7, frame elements beyond the RelationshipID, AES GCM Nonce, and PayloadSize are encrypted and may encompass up to 65,508 Bytes.

The RelationshipID 73 is the only unencrypted AKM Identifier field within an AKM data frame and is this ID enables the Broadcast Architecture default behavior of AKM. The AES and GCM Nonce 75 (both prior art frame elements) is used to maintain integrity and authentication of the payload 77. The PayloadSize is the size of the Payload field frame element. The Frame Type Bits (FT) determine if the frame is a Command frame, Data Frame, or another type of implementation specific frame type such as an Integrity Management frame or Data Analytics frame. The Application is an optional field specifying a particular device application. The Flags element bits indicate information about the frame, including whether or not there is an optional Destination Node Identifier field, and enable data frames to convey status and state information about the relationship, the node, and/or the frame and thus decrease the need for explicit command frames. The Replay Counter increments on every frame. The SourceNodeID identifies the sender of the frame. The DestinationNodeID is an optional field which identifies the target recipient, if any, of the frame. The FrameHeaderDigitalSignature is an HMAC based message authentication code (MAC) that digitally signs the unencrypted frame header as well as authenticating the sender of the data frame. As can be inferred from FIG. 7, the entire frame header, including the FrameHeaderDigitalSignature is transmitted in clear text. The Payload frame element is the encapsulated payload.

The AKM Transport Security Layer, together with the AKM KMS, are drop-in replacements for private key PKI and in-transit data transfer TLS/SSL (the TCP/IP stack security layers). The AKM technology stack shown in FIG. 7 seamlessly integrates into existing technology communications and security standards frameworks and does not require further retrofitting. Additionally, the exemplary AKM frame structure offers protection against Replay Attacks and Spoofing (when compared to TLS/SSL) with the following elements: 1) The AKM transport frame includes a "Replay Counter" that is part of the AKM frame structure. Thus, if the receiving AKM Edge Node does not see that the "Replay Counter" is greater than the previous frame, the frame is discarded; 2) The "Frame Header Digital Signature" authenticates the sender and the frame header, thus ensuring the frame header is not compromised; 3) The "Entire Frame Digital Signature" is encrypted, and authenticates both the sender and the entire frame (match or NO match); and 4) The "Replay Counter" is protected by both the Digital Signature and AES GCM mode authentication, hence, preventing modification of Replay Counter. Other elements may be substituted to added to this list of AKM frame structure features.

The AKM method and system is different than ZKA methods for several reasons. First, the authenticated private data in the AKM system is the resultant HMAC Based Digital Signature that is part of every data frame and is not accessible by the prover. "Provers" are used in ZKA systems. In the AKM system, the resultant HMAC Based Digital Signature is NOT accessible by the "prover" is nuanced, in that the "prover" (i.e., the transmitting node) has no control over the AKM signature value. The AKM signature value is calculated based on parameters supplied by its own internal "verifier," which the AKM systems refers to as the Secure Enclave, and/or, ideally, if the Secure Enclave has sufficient processing capacity, the Authenticated Private Data (the resultant HMAC Based Digital Signature) is calculated solely within the Secure Enclave at both ends. The Secure Enclave is "authenticated" by the ultimate Root of Trust (i.e., the Factory Backend Configuration (and the associated Database Server) (FBCS)) at the time of initial provisioning of the node in the AKM system, and hence the Secure Enclave is a proxy of the FBCS, which is the ultimate Root of Trust. The "verifier" in the AKM system is the Secure Enclave in the receiving node (which, as mentioned above, is a proxy for the FBCS, the ultimate Root of Trust). The "prover," which is transmitting node, supplies its calculated version of the "Private Data" to the receiving node. If the calculated version of the "Private Data" matches the "Authenticated" Private Data calculated by the "verifier" within the receiving node, then, the integrity of the AKM relationship is said to have been authenticated.

The HMAC or Hash Based Message Authentication Code, uses a strategy to simultaneously verify the integrity and authenticity of a message. This strategy is different from other authentication methods in that it uses a cryptographic key along with a hash function. The algorithm behind the HMAC is complicated by the hashing being performed twice. This dual hash resists forms of cryptographic analysis by bad actors and protects against threats. A HMAC is more secure than other similar message authentication codes and methods, as the data transmitted and key used in the process are hashed separately.

Another important aspect, of many important aspects, of the present invention is that the high entropy factor of the present invention. High entropy means that data are spread out as much as possible while low entropy means that data are nearly all concentrated on one value. If the entropy is low, therefore, there is a high concentration of information content and these low entropy data security systems are most likely to come up or reveal the associated cryptographic rule. The AKM system and methods uses security credentials with a high entropy factor, on the order of $10^{31}$. For example, by using a relatively small vector of say, 128-bytes, and then randomly selecting 15-bytes of the 128-byte AKM transport frame and then using those randomly selected bytes as part of the process in creating security credentials (the PDV and PDS discussed above), the number of permutations of even 15 different bytes from a single 128-byte vector is on the order of $10^{31}$, resulting in a high entropy security system. Hence, it is nearly impossible to hack by brute force the AKM resultant security credentials (HMAC) if nothing else is ever exposed. The beauty of this methodology is that even if the 128-byte vector is published in clear text, the potential would-be hacker would still not be able to ascertain the correct credentials without other knowledge. So long as no system-wide secrets are exposed, it is highly unlikely that quantum computing will be able to hack AKM security credentials based on this method. Preferably, the random selection vector is not published (see PDV and PDS), hence that sub-vector is confidential. Since (i) the random selection vector is secret, (ii) the transport frame is always encrypted when it is communicated, (iii) the transport frame is periodically and randomly refreshed, and (iv) every security relationship has its own unique vector, this AKM methodology is categorized as quantum safe. The transport frame is periodically and randomly refreshed.

AKM systems and methodologies are superior to PKI sharing and Bulk Encryption Key (BEK) generation. One of the many advantages of AKM is that, once configured or provisioned, the system and method never needs to share any secrets in order to continue running. The AKM system can be classified as a "One and Done" system with regard to its configuration and maintenance. In contrast to this feature of the AKM system, in a PKI system, any time PKI system wishes to update the Bulk Encryption Key (BEK), it must potentially expose the BEK, which, if intercepted, the system is considered to be breached or is highly vulnerable to a later breach or hacking event. This PKI update is a major drawback of nearly all PKI systems and, despite many safeguards, this flaw has been proven to be an Achilles Heel of the entire PKI framework.

In direct contrast to the PKI system, once someone understands the AKM system and finds or discovers that the Parameter Data Vector (PDV) is also shared (and hence, potentially exposed), this discovery is not fatal because each node has its own security credentials within its Secure Enclave. Access to the node's security credentials, stored in the secure enclave, is extremely difficult, if not impossible, because the security credentials permanently reside within a separate tamper resistant hardware module and are never exposed outside of that tamper resistant hardware module. The same result is achieved with software because its security credentials are stored in a Secure Enclave. In contrast, if the BEK is exposed by a breached PKI framework, all data from that session is now also exposed. If the PDV is exposed by a breached AKM framework, nothing bad happens. There is little or no damage. Unless the potential bad actor has access to the security credentials within the Secure Enclave itself (which, by design, is highly unlikely and practically impossible, because the security credentials permanently reside within a separate tamper resistant hardware/software module), there is nothing for the potential bad actor to base a potential breach on. There is no starting point for the potential breach. For this reason, the AKM system and method is quantum safe from breach and hacking.

Figure 8:
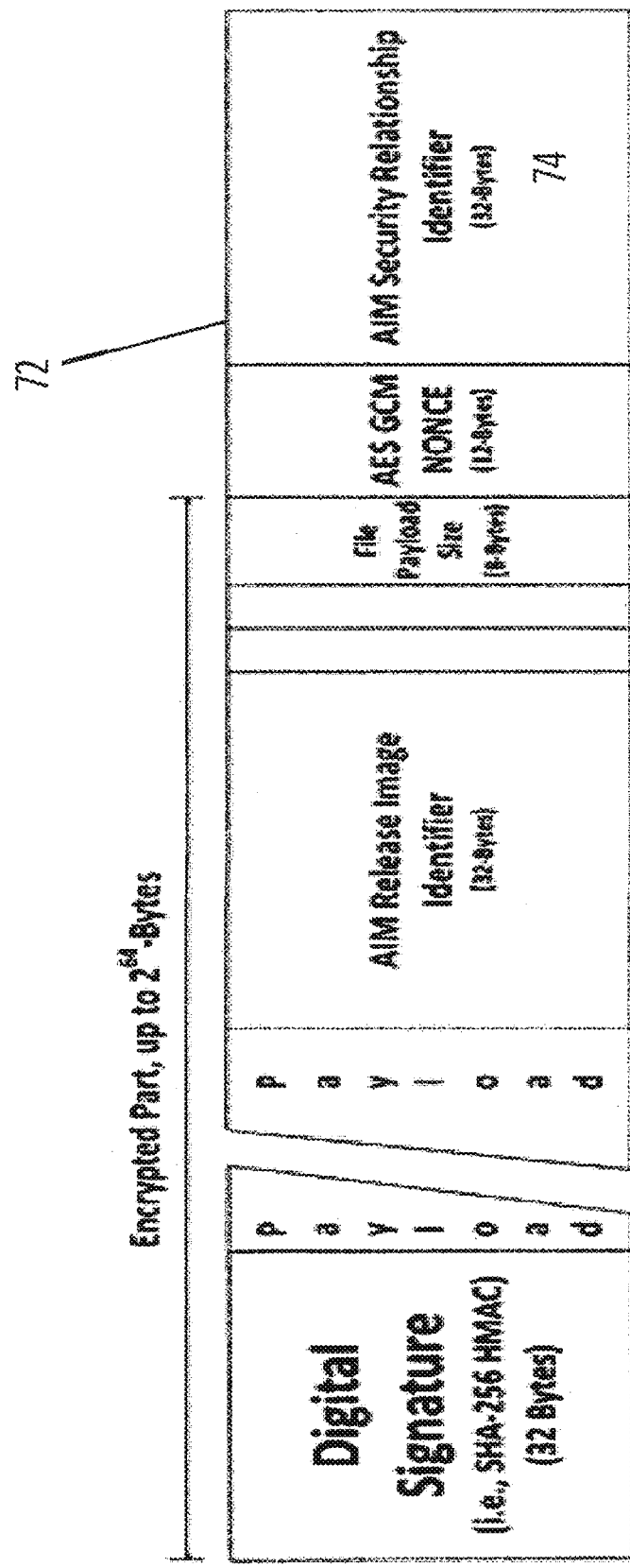
FIG. 8 diagrammatically shows a slightly different AKM Frame Structure as an Asset Integrity Management (AIM) File Structure with exemplary byte sizes and assumes an ASR relationship between the FBCS (Factory Backend Configuration Server and its database) and the Target Edge Node (this AIM file structure is different than the data transport AKM Frame Structure in FIG. 7).

FIG. 8 diagrammatically shows a slightly different AKM Frame Structure as an Asset Integrity Management (AIM) File Structure 72. This scenario assumes an AIM security relationship between the FBCS (Factory Backend Configuration Server (with optional Database) and the Target Edge Node. The AIM file structure in FIG. 8 is different than the data transport AKM Frame Structure in FIG. 7. The AIM security relationship between the FBCS and the Target Edge Node may be done via a portable static storage device, like a USB drive. It is important to make the distinction that the AIM Security Relationship Id 74 is a different type of set of security credentials as compared to the AKM Security Relationship. The AKM Security Relationship 73 controls data-in-motion or data in-transit, while the AIM Security Relationship 74 controls data-at-rest and data-in-use. Data- at-rest is stored data whereas data-in-use is currently subject to an ongoing processing event.

FIGS. 9A, 9B and 9C diagrammatically show an AKM-AIM Device Authentication system-type flow chart. FIGS. 9A and 9B are conjoined together and centered about Hardware Device D1 81 in that the conjoined image 9A-9B diagrammatically shows an AKM-AIM Device Authentication system-type flow chart. FIG. 9C diagrammatically shows production of the Device Integrity Code (DIC) for the hardware encased software and data storage system. In general, the AKM-AIM system provides device authentication via a Device Integrity Code (DIC) (shown in FIG. 9C) by binding the firmware image FIC-IMG 60B (FIGS. 9A, 9B (Boot Image A1 81 and Application (Appln) Image A2 81A)) to the physical hardware 81 via an AIM Secure Enclave 83 in FIG. 9A. The AssetTagDevice includes, among other things, the hardware HW GUID. The FIC image is the firmware release for the specific device. The process enables a "Verifier" which accounts for the bounded firmware image and physical hardware secure enclave. FIG. 9A includes enclave 83; HD Device D1 81; copy of D1 Asset tag 81A; copy of DIC 01 81B; Key Management Credentials 83A; copy of FIC A2 87B; copy of A1 Asset Tag 85; copy of FIC A1 85A; and copy of A2 AIM Asset tag 85B. FIG. 9B includes hardware (HD) 81; HMAC for FIC A2 87B; A2 Asset Tag 85B; EAI A2 81A; A1 Asset Tag 85; HMAC FIC al 85A; and Electronic Boot Image A1 81C.

FIG. 9A diagrammatically shows that the Hardware Device D1 81 has an AKM AIM Secure Enclave 83 containing the key management security credentials 83A for HD hardware device D1. Alternatively, the AIM Secure Enclave may be on a thumb drive mounted in a port on hardware device D1. At provisioning, the hardware device D1 is processed to include an original copy of D1's Device Asset Tag 85.

One configuration of the Device Asset Tag is discussed in conjunction with the following Asset Tag Device Table. The Table diagrammatically shows the Asset Tag data structure. Other asset tag structures may be employed. Relevant fields for the asset tag device include, but are not limited to: 1) an Asset Tag Type, which may be an enumerated value, that is, the first field in every asset tag; 2) a Hardware Device AKM Identifier which may be the AKM Identifier for the physical device. The AKM identifier is typically the second field in every asset tag. In this example, the default length of a physical device AKM identifier is 128-bits. Coincidentally, this is also the address associated with the device for AKM communication relationships; 3) Device Manufacturer data which is an enumerated type of different manufacturers of the chipset (for example, NXP, Intel, STM, TI, etc.); 4) a Device Manufacturer Globally Unique Identifier (GUID) which is a unique value that can be read internally within the CPU processor chipset, that provides a unique identifier for the specific component; 5) a Device Type which is an enumerated type that represents the type of device, where the device type uses locally defined delineations (for example, within an automotive environment, it would be the type of ECU (electronic control unit); and 6) a Manufacturer Release Date which is the precise date of the release of the hardware revision, not necessarily the date the hardware was released. Other configurations of the asset tag device table may be formulated to uniquely identify the hardware asset from all other similar hardware assets.

| Asset Tag Device Table |
| --- |
| AKM Physical Device Provisioning Relationship Identifier: TBD |
| AKM Device Identifier: TBD |
| Device Manufacturer Globally Unique Identifier (GUID): TBD |
| Device Type |
| Manufacturer Date |
| Manufacturer |

Returning to FIG. 9A, the original copy of the D1 Device Asset Tag 81A is represented in the AKM Secure Enclave 83, as is the original copy of the Device Integrity Code or DIC-D1 81B.

FIG. 9C diagrammatically illustrates that the DIC-D1 is formed as a HMAC (keyed-hashing message authentication code) consisting of the Device Asset Tag D1 60C, the HWID-D1 60A, and the File Integrity Codes FIC-A1 and FIC-A2 (collectively 60B), which HMAC can be generally described in the following formula. In this embodiment, the DIC is a hash code (HMAC) run over an aggregate of information directly associated with a device, including all electronic image (EI) components that are specified to be part of a device. Typically, the EI is the firmware release for the specific device. Sometimes the Backend service FBCS assigns the HWID rather than using the manufacturer GUID. In one embodiment, the DIC is a 256 bit SHA256 resultant HMAC run over an aggregate of information directly associated with a device, including all of the electronic image components that are specified to be part of a device by the Backend Server's (FBCS) configuration management system, as well as the SDS (sync data set) of the device.

DIC-*D*1 HMAC=HMAC((DeviceAssetTag
*D*1)∥HMAC(HWID-*D*1)∥HMAC(FIC-*A*1)
∥HMAC(FIC-*A*2))    DIC-D1 Equation In this embodiment, the DIC is derived by taking the digital signature of the coupling of an HMAC of the Device's Asset Tag (which includes, amongst other things, the HW GUID (the hardware globally unique identifier) from the chipset manufacturer) and an aggregation of the File Integrity Codes of all of the electronic images comprising the firmware release for the specific device. The GUID is a 128-bit text string that represents identification (ID) data.

Returning to FIG. 9A, the AKM Secure Enclave 83 contains the security credentials consisting of 1) the original copy of the DIC-D1; 2) the original copy of the D1 Device Asset Tag; 3) the original copy of the FIC-A1; 4) the original copy of the A1 AIM asset Tag; 5) the original copy of the A2 AIM asset Tag; and 6) the original copy of the FIC-A2. The Secure Enclave 83 stores this original security credential 83A. The Secure Enclave is preferably encased in hardware device D1 but may be otherwise digitally available (e.g., fob, dongle, flash drive, hardware device data store, an onboard data store a dedicated data store, etc.).

FIG. 9B diagrammatically illustrates that the File Integrity Code for Appln Electronic Application Image A2 (FIC-A1) (upper left, 85A) is derived by taking the digital signature of the coupling between an HMAC of Electronic Appln Image A1 (a file Image Asset, 81C) and the electronic file image's provisioning asset tag, A1 AIM Asset Tag 85. One example of an Image Asset Tag is discussed later. FIG. 9B also diagrammatically illustrates that the File Integrity Code for Boot Image A2 (FIC-A2) (lower left, 87B) is derived by taking the digital signature of the coupling between an HMAC of electronic Boot Image A1 (Image Asset A1, 81C) and the electronic image's provisioning asset tag, the A2 AIM Asset Tag 85.

One example of Electronic Image Asset Tag Data Structure (1st Stage Bootloader with BSP) follows. See Asset Tag Type Asset Tag Electronic Image Table 1 below. BSP refers to Binary Space Partitioning which implemented for recursively subdividing a space into two convex sets by using hyperplanes as partitions. This process of subdividing gives rise to the representation of objects within the space in the form of tree data structure known as BSP Tree. Other Image Asset Tag structures may be used.

The following Asset Tag Type—Electronic Image Tables are examples for the asset tag data components. The Asset Tag data structure for an Electronic Image (EI) may include the following relevant fields, but the EI Asset Tag may have different data elements, hence, the relevant fields include, but are not limited to: 1) Asset Tag Type which is an enumerated value, that is the first field in every asset tag; 2) an Electronic Image AKM Identifier which is the AKM Identifier for the physical device. The AKM identifier is always the second field in every asset tag in this example. For now, the default length of an electronic image AKM identifier is 128-bits; 3) Electronic Image Type which is the 1st Stage Bootloader (sometimes referred to as the bootloader, which is a separate program in the program memory that executes when a new application needs to be loaded/reloaded into memory; 4) Electronic Image Length which is a 4-byte field (as an example) representing the length of the electronic image in bytes; 5) Electronic Image Revision Number which is of an implementation-dependent format and value, with the default size being 64-bits (exemplary); 6) Electronic Image Release Date and Time which is a 12-byte field (exemplary), expressed in a combined UTC-based date and time format. Optionally, Table 1 can omit the BSP from the file structure element "Electronic Image Type: 1st Stage Bootloader with BSP."

TABLE 1

| Asset Tag Type: Asset Tag for Electronic Image |
| --- |
| AKM Electronic Image Identifier: TBD |
| Electronic Image Type: 1st Stage Bootloader with BSP |
| Electronic Image Length (in bytes): TBD |
| Electronic Image Revision Number: TBD |
| Electronic Image Release Date: TBD |

The following Asset Tag Type Table 2 provides an example of an EI Asset Tag Data Structures (2nd Stage Bootloader & Application).

TABLE 2

| Asset Tag Type: Asset Tag for Electronic Image |
| --- |
| AKM Electronic Image Identifier: TBD |
| Electronic Image Type: $2^{nd}$ Stage Bootloader |
| Electronic Image Length (in bytes): TBD |
| Electronic Image Revision Number: TBD |
| Electronic Image Release Date: TBD |

The AKM system and method can be deployed over subsystems as follows. Assume the subsystem has three devices, D1, D2, and D3 which form Subsystem SS1. Subsystem (SubSys) D1 has a SubSysD1 Secure Enclave storage, handling an HMAC representation of (a) SS1 Asset Tag SS1<D1, D2, D3>; (b) SubSysD1-D1 Asset Tag; (c) SubSysD1-D2 Asset Tag; and (d) SubSysD1-D3 Asset Tag. SubSys D2 has a SubSysD2 Secure Enclave storage, handling and HMAC for (a) SS1 Asset Tag SS1<D1, D2, D3>; (b) SubSysD2-D1 Asset Tag; (c) SubSysD2-D2 Asset Tag; and (d) SubSysD2-D3 Asset Tag. Further, the third SubSys D3 system would process (a) SS1 Asset Tag SS1<D1, D2, D3>; (b) SubSysD3-D1 Asset Tag; (c) SubSysD3-D2 Asset Tag; and (d) SubSysD3-D3 Asset Tag. Thus, each SubSys device maintains both asset tags of the other two SubSys devices (in addition to its own asset tag), plus asset tags for its subsystem hardware, software and data (which is calculated from aggregating the other asset tags of the individual devices within the subsystem).

The AKM system and method can be deployed over a Complete System (CSI) formed by two or more different SubSystems, SS1 and SS2. Each device maintains the asset tags of the all other devices within its own SubSystem, plus the asset tags of the other adjacent SubSystems, plus the asset tag of the entire CS1 system. This distributive architecture approach prevents any single point of failure, thus further ensuring the integrity of the entire system. For example, SubSys SS1 has Device D4, SubSys SS1 has Device D5, and SubSys SS1 has Device D5. Device D4 can be represented, in this example, as CS1-SubSysSS1-D4. Device D4 has a D4 secure enclave which processes key management security credentials for SS2<D4, D5, D6> and CS1<SS1, SS2> which incorporate the CS1 Asset Tag. Fed into the D4 secure enclave element is the SubSysSS1 Asset Tag; the SS2 Asset Tag; the D4 Asset Tag, the D5 Asset Tag and the D6 Asset Tag because SubSys SS1 includes devices D4, D5 and D6.

The Network Manager Module or NMM is operational part of the FBCS (Factory Backed Config Server) and is coupled or included with CS1. The SubSys in the Complete System is the main or central repository of all the complementary AKM keys or tokens for the system. There are hardware-keyed data tokens and software or initial data stored target-keyed data tokens, and, also, element-keyed data tokens and object-keyed data tokens.

Asset Tags and Asset Tag Types can be further identified in the following manner. A non-limiting collection of types of Asset Tags are 1) Electronic Image tag which represents a data-at-rest image; 2) Container tag which represents a data-in-use software object; 3) a Physical Device-Static physical entity tag; 4) a Subsystem of Devices and/or other Subsystem tags which are Virtual Objects representing a specific group of devices; and 5) a System of Devices and/or Subsystem tags which are Virtual Objects representing a group of groups of devices (these are hierarchical groupings of AKM-enabled systems. An asset tag is the foundation for an asset-based AKM Security Relationship (ASR). Asset-based ASRs are used to establish, maintain, and monitor, the integrity and authenticity of system components. The Asset Tag, together with the asset(s) it represents, is used to calculate and derive the digital signature representing the Asset.

Figure 11:
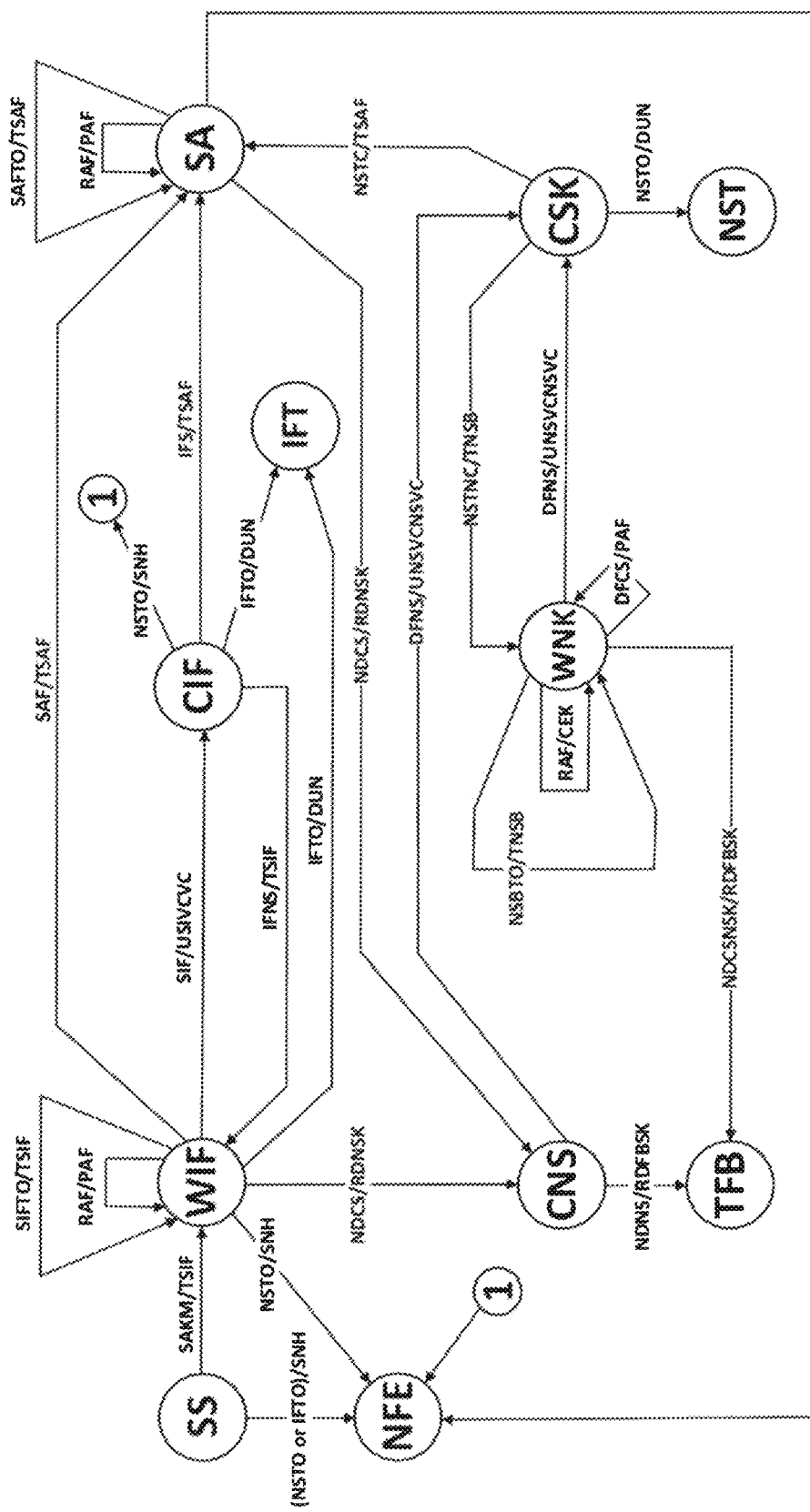
FIG. 11 diagrammatically illustrates an exemplary AKM Finite State Machine (FSM) Event Descriptions FIG. 12 diagrammatically illustrates an example of an AKM Protocol for Failsafe Processing as a Context Free Finite State Machine (FSM) wherein abbreviated states, actions, and events are diagrammatically illustrated.
Figure 12:
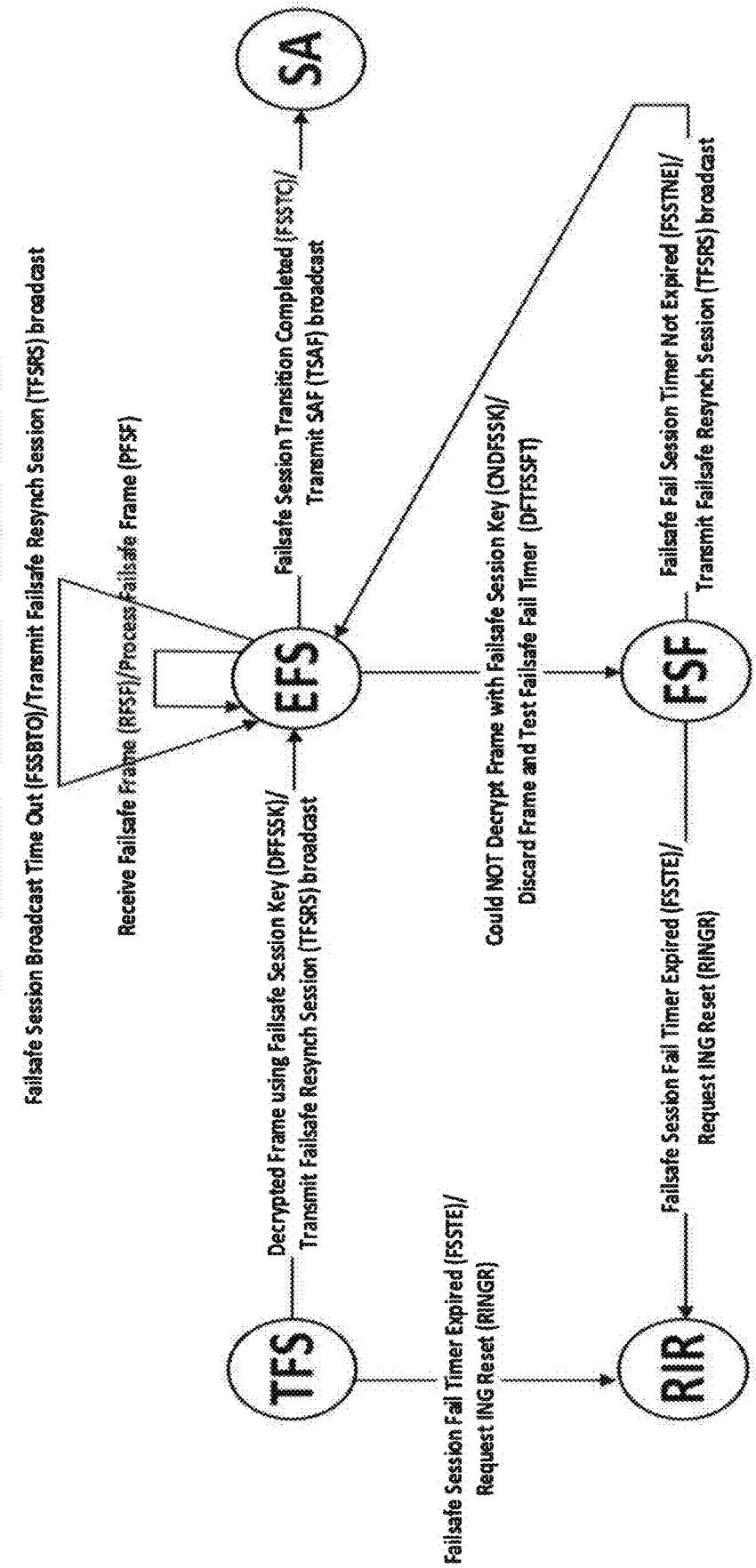

FIG. 11 diagrammatically illustrates an example of an AKM Finite State Machine (FSM) 91 with abbreviated state and event names. FIG. 13 is an Abbreviations Table listing many abbreviations used in the description of embodiments of the present invention and further includes abbreviations used in FIG. 11, the Finite State Machine (FSM). FIGS. 11, 12, and 13 are closely related in that manner. For example, the abbreviated State and Event names in FIG. 11 are listed in FIG. 13. In the FSM flow chart, FIG. 11, the "1" indicator is a jump point from event NSTO/SNH to Non-Fatal Exception (NFE) State. The flow chart of the FSM identifies data and event processes as one embodiment of the present invention. The following sectional paragraphs explain the exemplary FSM State Descriptions; exemplary QLS Incoming Frame Processing (see also FIG. 7); exemplary QLS Outgoing Frame Processing (see also FIG. 7); exemplary QLS Frame Header and Bit Field Incoming Frame Processing (a modified FIG. 7 frame); exemplary QLS Frame Processing for Session Integrity Vector (SIV); exemplary QLS Frame Processing for Tracking Vectors, for SIV, Tracking Vectors for Next Session Vector (NSV), Tracking Vectors for Add Node Vector (ANV), and Tracking Vectors for Remote Node Vector (RNV); AKM Finite State Machine (FSM) Event Descriptions; AKM FSM for Event Descriptions for the Finite State Machine of FIG. 11.

FIG. 13 is an Abbreviations Table for items discussed in this detailed description of one embodiment of the present invention. All state and event acronyms, that is legends, shown in FIG. 11, the Finite State Machine (FSM) (one embodiment of the present invention), are listed in FIG. 13, the Abbreviations Table.

FSM State Descriptions: Session Start (SS) State. Each ASR has an ascending order of priority that determines which node within the ASR will transmit the SEF first. If within a preconfigured time, that does not begin transmitting after power-on reset, the next node by order of priority will transmit the SEF, and so on, until finally one of the nodes within the ASR is successful at starting the session.

Session Establishment Frame (SEF). The SEF is a normal AKM Data Frame (ADF), with whatever payload the sender wishes to send. The only difference is that SIF bit flag is set and remains set until all nodes within the ASR have transmitted at least one ADF with the SIF set.

Wait for Initialization Flag (WIF) State. The FSM remains in a loop between this state and the CIF state, as it continues to read AKM Data Frames. All frames should fall into one of two categories. Either their "Session Initialization Flag" is set, in which case, it will transition to the CIF. Otherwise (an OR operation), if the "Session Activated Flag" is set, in which case, it will transition to the SA state.

Check Initialized Flag (CIF) State. This state checks to see if all of the nodes have transmitted at least one frame with the "Session Initialized Flag" (SIF) set. If so, the FSM transitions to the SA state. If not, it transitions back to the WIF state, unless an, "Initialized Flag" timeout has occurred, in which case, it transitions to the IFT state.

Initialized Flag Timeout (IFT) State. If after a configured period of time, all nodes have not responded with their, "Session Initialized Flag" being set, then the FSM transitions to the, "Initialized Flag Timeout" state. This is the initial state in the, "Initialized Flag Timeout" FSM subset (represented and detailed separately).

Session Activated (SA) State. The FSM remains in a loop in this state, and unless there is an error or a resynch event continues to read AKM Data Frames. All frames should fall into one of two categories. Either their "Session Confirmation Flag" is set, in which case, it will transition to the CCF state. Otherwise (an OR operation), the "Session Active Flag" is set, in which case, it will transition to the SA state.

Check Next Session (CNS) State. The FSM transitions to this state when the CNS state checks to see if the Next Session Key is able to decrypt the current frame. If so, then, the FSM must transition the Edge Node and the associated ASR to the next set of security credentials.

Check Session Key (CSK) State. This state checks the current ADF being processed to see if the ASR has completed the transition with all nodes using the Next Session set of security credentials.

Wait for Next session Key (WNK) State. The FSM remains in a loop between this state and the CSK state, as it continues to read AKM Data Frames. All frames should fall into one of two categories. Either they can be decrypted using Current Session security credentials or Next Session security credentials. If it is Current Session security credentials, it remains in this state. If it is Next Session security credentials, it transitions to the CSK state. If it cannot decrypt the frame with either set of security credentials, it transitions to the EFB state.

Next Session Timeout (NST) State. The FSM transitions to its Next Session Timeout FSM subset. This is the entry point of that FSM subset (represented and detailed separately). It enters into this state after receiving an event indicating that the amount of time to wait for the entire ASR to transition to the next session BEK has expired.

Try FallBack (TFB) State. The current ADF could not be decrypted with either the Current Session BEK nor the Next Session BEK. Thus, the FSM transitions to the "Try Fall-Back" FSM subset (represented and detailed separately).

Non-Fatal Exception (NFE) State. This state is entered whenever there is a State/Event transition that is not expected within the FSM. Meaning, an event occurred within a particular state that should not have occurred while in that state. Thus, the FSM needs to go to this state as a means of capturing whatever data it can in order to determine how that happened (that the FSM had a State/Event transition that was not expected).

The FSM QLS (Query Languages) Frame Processing Descriptions are set forth the following paragraphs.

QLS (Query Languages) Frame Processing; QLS Frame Processing (Incoming) (see FSM FIG. 11 and FIG. 7 (message frame example)). In general, QLS incoming and QLS outgoing frame processing uses QLS Protocol Processing Performing: 1) Frame Header Processing; 2) Digital Signature Processing; and 3) Encryption Processing. The following discussion of QLS Incoming Frame Processing refers to the frame structure diagrammatically shown in FIG. 7. The following is an overview of processing an incoming QLS frame: 1) First, there is there is the recognition of the frame being delineated into an unencrypted part and an encrypted part; 2) If the relationship identifier does not match a security relationship within the AKM Node, then the frame should be discarded; 3) The nonce should then be used by the AES offload engine to decrypt the encrypted part; 4) The Frame Header Digital Signature should be used to validate the non-payload fields (i.e., all fields starting from the Relationship ID down to the Destination ID), but doing so only AFTER the frame header fields which are in the encrypted part of the frame, have been decrypted; 5) Assuming a valid frame header, check the "Replay Counter"; 6) Process application and flags bits accordingly (i.e., this is implementation dependent); and, 7) After stripping off frame header, send the payload to the application specified by the application bits.

QLS Frame Processing (Outgoing) (see FSM FIG. 11 and FIG. 7). This frame processing software module is also deployed in each of the AKM Edge Nodes. The following is an overview of processing an outgoing QLS frame: 1) Fill out the Relationship ID, Source ID, and Destination ID (if applicable); 2) Add a valid nonce, that is, it should be randomly generated (using Fisher-Yates to generate this from a NONCE specific PDV (NPDV) of 256-bytes or larger). For instance, an NPDV of 4,096 bytes and a sample size of 12 (the size of the nonce in bytes) is on the order of 1043. Each AKM Edge Node should have its own unique NONCE generator. This should NOT be synchronized with "other" AKM Edge Nodes within the same ASR; 3) Insert the Payload Size; 4) Apply application and flag bits as specified by the application; 5) Calculate the Replay Counter; 6) Calculate the Frame Header Digital Signature to validate the non-payload fields (i.e., all fields starting from the Relationship ID down to the Destination ID); 7) Add in the payload; 8) Encrypt the encrypted part of the frame with AES-GCM; and 9) Pass it down to TCP or UDP which is context and/or implementation dependent.

QLS Frame Processing (Frame Header and Bit Fields). The following frame header and bit field discussion is assisted by the frame structure in FIG. 7 and the processes in FSM FIG. 11, however, an additional frame block for a Session Integrity Vector (SIV) is added to the encrypted portion of the frame, that is, near the Replay Counter, Source Node ID, Destination Node ID and Frame Header Digital Signature frame blocks. In this exemplary embodiment, the Session Integrity Vector (SIV) is in increments of 16-bits, up to implementation specific ASR size. The Default ASR Size is 16-bytes and the Default SIV Size is 2-Bytes. In this example, the QLS frame header has eleven (11) bits available for use. Bit definitions that are available, include, but are not limited to, the following bits: A) Bits 0-2: Session Indicator Values indicate the "state" of the session; (i) Value: 000 is undefined and does not use the SIV; (ii) Value: 001 is the Session Initialization (Current Session BEK). This value is represented when an AKM Edge Node is initially powered on and/or just coming out of reset. The purpose of the bit is to convey to other AKM Edge Nodes it is an active participant within the AKM Security Relationship (ASR), but is still waiting for confirmation for other AKM Edge Nodes within the ASR to confirm their participation either directly (with their own Session Initialization Bit set) or indirectly (via the Session Integrity Vector (SIV)). The SIV is sent whenever this bit is set and indicates which AKM Edge Nodes it is aware of, including itself. The SIV is "OR'd" with the host Edge Node's SIV, as a means of expediting the session to becoming fully active; (iii) Value: 010 is a Session Activated (Current Session BEK (CS-BEK)) indicator. This bit is set to indicate that all, active nodes within the ASR are actively participating within the session and as far as it knows, it the ASR is still using the Current Session BEK. Thus, it has no need for the SIV and is not part of the frame header when the Session Indicator Values are set to this value; (iv) Value: 011 is a Session Activated (Next Session BEK (NS-BEK)) indicator. This bit is set to indicate that all, active nodes within the ASR are actively participating within the session, but the ASR is currently transitioning to a new session and this particular node is using the Next Session BEK (NS-BEK). This value represents that the ASR is currently transitioning to a new session. The SIV is used to facilitate completion of the Next Session transition process. B) Bit 3: AKM Address Indicator generally includes, but is not limited to, (i) Value: 0, which indicates an AKM Broadcast, which results in there being no Destination Node ID included within the frame. There is only the AKM Relationship ID (which in essence, is a broadcast address for the ASR), plus an AKM source identifier, representing the AKM Edge Node which sent the incoming AKM data frame; and (ii) Value: 1, which indicates a regular AKM frame with both a source and destination address, in addition to the AKM Relationship Identifier, which every AKM data frame has. C) Bits 4-10 are currently undefined in this exemplary embodiment of the invention.

QLS Frame Processing for the Session Integrity Vector (SIV) again uses a modified version of the frame structure in FIG. 7, and the processes in FSM FIG. 1, wherein an additional frame block for a SIV is added to the encrypted portion of the frame. The Session Integrity Vector (SIV) uses 1-bit per AKM Edge Node to represent the associated AKM address within an ASR. The bits are ordered in the same order as to how the AKM Edge Node are ordered within the ASR's Synchronized Data Set (SDS). All nodes within a Synchronized Data Set are ordered in ascending order according to their AKM Identifier and are traversable via a balanced binary tree.

QLS Frame Processing for Tracking Vectors SIV, NSV Next Session Vector, ANV Add Node Tracking Vector, and RNV Remote Node Tracking Vector. This discussion of tracking vectors again uses a modified version of the frame structure in FIG. 7, and the processes in FSM FIG. 11, wherein an additional frame block for a SIV is added to the encrypted portion of the frame. These tracking vectors include, but are not limited to, the following protocols and features: 1) The Session Initialization Vector (SIV) field within the AKM frame header is only used during state transitions coming out of power-on/reset; 2) The SIV field is also used to represent the transmitting edge node's SIV; 3) The SIV is of an implementation dependent length, done so in increments of 2-bytes (16-bits) to reflect the maximum size of an AKM Security Relationship (ASR). So, if the implementation limit is 16-Nodes or smaller within a single ASR, only two bytes are used to represent the SIV within the header. If 32-nodes are smaller is the limit (but greater than 17), then, likewise, 4-bytes are used, and so on; 4) While not necessary to share this information between nodes, as synchronization can be accomplished without this, it would just take longer. With an OR operation, the SIV from an incoming edge node with the SIV of the host node, will greatly expedite the overall synchronization process for obvious reasons; 5) Similarly, the Next Session Vector (NSV) is used for tracking which nodes within the ASR have transitioned to the Next Session Set of Credentials; 6) The Add Node Vector (ANV) keeps track of which nodes have been accepted a new node into the ASR; and 7) The Remove Node Vector (RNV) keeps track of which nodes have deleted an existing node from the ASR.

AKM Finite State Machine (FSM) Event Descriptions are diagrammatically shown in FIG. 11. The Abbreviations Table in FIG. 13 assists the description of the following FSM Events. The FSM Event Descriptions are set forth the following paragraphs.

Start AKM (SAKM) Event. This event is used to start the AKM Finite State Machine (FSM).

Receive AF (RAF) Event. This event indicates that an AKM Frame has been received and is ready for processing.

Session Initialized Flag (SIF) Event. This event indicates that the SIF bit was set within the current ADF being processed.

Session Activated Flag (SAF) Event. This event indicates that the SCF bit was set within all nodes and the session is now fully active and the next session BEK should now become the current session BEK.

SIF Time Out (SIFTO) Event. This event indicates that the amount of time since the last SIF broadcast frame was transmitted from the Edge Node has been exceeded.

SAF Time Out (SAFTO) Event. This event indicates that the amount of time since the last SAF broadcast frame was transmitted by the Edge Node has been exceeded.

Next Session Broadcast frame Time Out (NSBTO) Event—This event indicates that the amount of time since the last Next Session broadcast frame was transmitted by the Edge Node has been exceeded.

Initialized Flag Timeout (IFTO) Event. This event indicates that the maximum time allotted has now been exceeded for the all of the nodes within the ASR to have broadcasted at least one frame with its SIF bit set.

Next Session Timeout (NSTO) Event. This event indicates that the maximum time allotted for the entire ASR to have become active, has now been exceeded. That is, for all of them to have broadcast a frame with either their SCF or SAF bit set.

Initialized Flag Not Set (IFNS) Event. This event indicates that there still remains at least one or more nodes within the ASR have not joined the current session initiation.

Initialized Flag Set (IFS) Event. This event indicates that the Session Initialized Flag has been set in all nodes within the ASR, which means, that all nodes within the ASR are engaged in this AKM session.

Next Session Transition Not Completed (NSTNC) Event. This event indicates that there still remains at least one or more nodes within the ASR that is not using the next session BEK.

Next Session Transition Completed (NSTC) Event. This event indicates that all nodes within the ASR are now using the next session BEK.

Could NOT Decrypt Frame with CS-BEK (NDCS) Event. This event indicates that the current AFD cannot be decrypted using the current session BEK.

Check Encryption Key (CEK) Event. This event checks to see if either the current session key or next session key can decrypt the frame.

Decrypted Frame with NS-BEK (DFNS) Event. This event indicates that the current AFD was successfully decrypted using the next session BEK.

Could NOT Decrypt Frame with NS-BEK (NDNS) Event. This event indicates that the current AFD cannot be decrypted using the next session BEK.

Decrypted Frame with CS-BEK (DFCS) Event. This event indicates that the current AFD was successfully decrypted using the current session BEK.

Could NOT Decrypt Frame with either the CS nor NS BEK (NDCSNSK) Event. This event indicates that neither the current or next session sets of security credentials were able to decrypt the current frame.

To explain the AKM Finite State Machine Irregular Actions in the FSM in FIG. 11, the Abbreviations Table of FIG. 13 is helpful in describing the following AKM FSM Irregular Action Descriptions. These irregular actions are only exemplary of the AKM invention herein. The FSM Irregular Action Descriptions are set forth the following paragraphs.

Do Nothing (DN)—This action indicates the FSM to not take any action as a result of the event/state transition process.

Process Error (ERROR)—Performs Error processing in accordance with the parameters passed into it of current state and event.

Report Exception (REPTEXCP)—Exception Processing, similar to "Process Error", but more severe. Something must be done as a consequence of this being called, whereas "Error Processing" is more of a logging of a problem, but not necessarily any action that must occur as a consequence.

Should Not Happen (SNH)—This indicates that the state machine somehow allowed an event that should never occur with the given state. Action is State/Event specific.

Deactivate Unresponsive Nodes (DUN)—Deactivate for the current session only the Edge Nodes within the ASR that have not participated in Session Initiation.

Check Encryption Key (CEK)—Checks to see if either the current session key or next session key can decrypt the frame.

Retry Decryption with Next Session Key (RDNSK)—indicates that the normal current session key does not work, so perhaps try the next session key to see if the rest of the AKM Security Relationship has started to transition to the next session.

Retry Decryption with Fallback Session Key (RDFBSK)—indicates that neither the normal current session key nor the next session key are able to decrypt the current frame, so the next logical step is to see if the Fallback Session Key is able to decrypt the frame.

Retry Decryption with Failsafe Session Key (RDFSSK)—indicates the current session key, the next session key, and the Fallback Session key, all failed to decrypt the frame. Thus, the next logical step is to see if the Failsafe Session Key is able to decrypt the frame.

Discard Current Frame (DCF)—Indicates that the current frame should be ignored and discarded.

To explain the AKM FSM Standard Actions in the FSM in FIG. 11, the Abbreviations Table of FIG. 13 is helpful in describing the following AKM FSM Standard Action Descriptions. These standard actions are only exemplary of the AKM invention herein. The FSM Standard Action Descriptions are set forth the following paragraphs.

Transmit SIF (TSIF) broadcast. The Edge Node should issue a broadcast frame with the Session Initiated Flag bit set.

Process AKM Frame (PAF). Process the AKM Frame, after first decrypting it.

Transmit SAF (TSAF) broadcast. The Edge Node should issue a broadcast frame with the Session Activated Flag bit set.

Transmit NS Broadcast (TNSB) frame. The Edge Node should issue a broadcast frame using the Next Session BEK.

Update Session Initialized Vector and Check if Session Initialized Vector is Complete (USIVCVC). Update the current SIV with the SIV from the incoming frame and check to see if the SIV is now complete.

Update Next Session Vector and Check if Next Session Vector is Complete (UNSVCNSVC). Update the current NSV with the NSV from the incoming frame and check to see if the NSV is now complete.

An exemplary AKM Protocol Fallback Processing scheme, a Context Free Finite State Machine, has the following events, actions and states. Other configuration of fallback processing may be utilized. A) Events: CNDF: Could NOT Decrypt Frame with any known keys; CNDFBSK: Could NOT Decrypt Frame with Fallback Session Key; DFFBSK: Decrypted Frame using Fallback Session Key; DFFSSK: Decrypted Frame using Failsafe Session Key; FBSBTO: Fallback Session Broadcast Time Out; FBSFTE: Fallback Session Fail Timer Expired; FBSFTNE: Fallback Fail Session Timer Has Not Expired; FBSTC: Fallback Session Transition Completed; and RFBF: Receive Fallback Frame. B) Actions: DFTFBSFT: Discard Frame and Test Fallback Session Fail Timer; PFBF: Process Fallback Frame; RDFSK: Retry Decryption with Failsafe Session Key; TFBRS: Transmit Fallback Resynch Session broadcast; TFSRS: Transmit Failsafe Resynch Session broadcast; and TSAF: Transmit SAF broadcast. C. States: CFB: Check Fallback State Set in All Nodes State Vector; CFS: Check Failsafe Resynchronization Session Key State; EFS: Enter Failsafe State; FBF: Fallback Fail Timer State; SA: Session Activated State; TFB: Try Fallback State; and TFS: Try Failsafe State.

An example of the State Descriptions for the Fallback Resynchronization FSM includes, but are not limited to, the following: 1) Try Fallback State (TFB). This is the entry point into the Fallback Resynchronization FSM. The AKM nominal case FSM enters this state if one or more nodes becomes out-of-synch. The Fallback Fail Timer starts upon initially entering this state. Once the timer has expired, the Fallback Resynchronization FSM will transition to the Failsafe Resynchronization FSM; 2) Check Fallback State (CFB). The Fallback Resynch FSM remains in this state so long as it is receiving frames that can be decrypted using the Fallback Session Key or the Current Session Key and all nodes within the Security Relationship have not successfully yet transitioned into the Fallback Resynch state; 3) Session Activated (SA) State. The FSM remains in a loop in this state, and unless there is an error or a resynch event continues to read AKM Data Frames. All frames should fall into one of two categories. Either their "Session Confirmation Flag" is set, in which case, it will transition to the CCF state. In an OR operation, the "Session Active Flag" is set, in which case, it will transition to the SA state; 4) Check Failsafe State (CFS). The Failsafe Resynch state occurs when the frame cannot be decrypted with the Fallback Session key; 5) Enter Failsafe State (EFS). This state is an entry point into the Failsafe Resynchronization FSM and is entered when the current frame can be decrypted using the Failsafe Resynchronization Session Key; 6) Fallback Resynchronization Session Fail Timer Test (FBF). This state is entered after the frame cannot be decrypted with any known key and it checks the Fallback Resynchronization Session Fail Timer to see if it has expired. If it has not expired, it discards the frame and returns back to the Check Fallback State. But, if it has expired, it transitions into the Try Failsafe State, which is an entry point into the Failsafe Resynchronization Session FSM; and, 7) Try Failsafe State. This state is entered after the Fallback Resynchronization Session Fail Timer expires and is an entry point into the Failsafe Resynchronization FSM.

An example of the Event Descriptions for the Fallback Resynchronization FSM includes, but are not limited to, the following: 1) Could NOT Decrypt Frame with any known keys (CNDF) Event. This event occurs when the current frame cannot be decrypted with any known available keys (i.e., current session key, next session key, Fallback Resynchronization session key, or Failsafe Resynchronization session key); 2) Receive Fallback Frame (RFBF) Event. This event indicates that a Fallback Resynchronization frame has been received and is ready for processing; 3) Could NOT Decrypt Frame with Fallback Resynchronization Session Key (CNDFBSK) Event. This event indicates that the current frame could not be decrypted with the Fallback Resynchronization Session Key; 4) Decrypted Frame using Fallback Resynchronization Session Key (DFFBSK) Event. This event indicates that the current frame was decrypted using the Fallback Resynchronization Session Key; 5) Decrypted Frame using Failsafe Resynchronization Session Key (DFFSSK) Event. This event indicates that the current frame was decrypted using the Failsafe Resynchronization Session Key; 6) Fallback Resynchronization Session (FBRS) Broadcast Time Out (FBSBTO) Event. This event indicates that the amount of time since the last FBRS broadcast frame was transmitted by the Edge Node has been exceeded; 7) Fallback Resynchronization Session (FBRS) Fail Timer Expired (FBSFTE) Event. The amount of time allotted to resynchronize the AKM security relationship during Fallback Resynchronization has been exceeded; 8) Fallback Resynchronization Session (FBRS) Fail Timer has NOT Expired (FBSFTNE) Event. The amount of time allotted to resynchronize the AKM security relationship during Fallback Resynchronization has not yet been exceeded; 9) Fallback Resynchronization Session Transition Completed (FBSTC) Event. This event indicates that the Fallback Resynchronization Session has been successful and the AKM security relationship has transitioned back into the AKM Nominal Case FSM; and 10) Receive Fallback Resynchronization Frame (RFBF) Event. This indicates that a new frame has been received and it was successfully decrypted using the Fallback Resynchronization Session key.

An example of the Action Descriptions for the Fallback Resynchronization FSM includes, but are not limited to, the following: 1) Discard Frame and Test Fallback Resynchronization Session Fail Timer (DFTFBSFT) Action. This action discards the current frame and checks to see if the time allotted for the Fallback Resynchronization Session Fail Timer has been exceeded; 2) Process Fallback Frame (PFBF) Action. This action indicates that the current frame is a valid Fallback Resynchronization Session frame and is processed accordingly. It is still an open question as to what exactly will be done during this processing, but that is relatively unimportant at this stage of AKM development; 3) Retry Decryption with Failsafe Resynchronization Session Key (RDFSK) Action. This action implicitly indicates that attempts to decrypt the current frame with either the current or next session nominal case session keys as well as the Fallback Resynchronization Session key, have all failed and the Failsafe Resynchronization Session key should now be tried to decrypt it; 4) Should Not Happen (SNH). This indicates that the state machine somehow allowed an event that should never occur with the given state. Action is State/Event specific; 5) Transmit Fallback Resynch Session Broadcast (TFBRS) Action. This action occurs as a result of the Fallback Resynchronization Timer expiring, which then requires the Fallback Resynchronization Session FSM to send out another Fallback Resynch Session broadcast in order to facilitate and expedite Fallback resynchronization; and, 6) Transmit SAF (TSAF) broadcast. The action indicates that the edge node should issue an AKM nominal case broadcast frame with the Session Activated Flag bit set. Meaning, the edge node and its affiliated security relationship are returning back to a normal AKM FSM.

FIG. 12 diagrammatically illustrates an example of an AKM Protocol for Failsafe Processing, a Context Free Finite State Machine (FSM). The abbreviated states, actions, and events are discussed below and some abbreviations are found in the Abbreviations Table of FIG. 13.

Failsafe—Autonomous System and Method. Referring to FIG. 12, the Failsafe Events, Actions and States are summarized as follows: (A) Events: 1) CNDFSSK: Could NOT Decrypt Frame with Failsafe Session Key; 2) DFFSSK: Decrypted Frame using Failsafe Session Key; 3) FSSBTO: Failsafe Session Broadcast Time Out; 4) FSSFTE: Failsafe Session Fail Timer Expired; 5) FSSTNE: Failsafe Fail Timer Has Not Expired; 6) FSSTC: Failsafe Session Transition Completed; and 7) RFSF: Receive Failsafe Frame. (B) Actions: 1) DFTFSSFT: Discard Frame and Test Failsafe Fail Timer; 2) PFSF: Process Failsafe Frame; 3) RINGR: Request ING Reset ING refers to the Network Gateway Module); 4) TFSSR: Transmit Failsafe Resynch Session broadcast; and 5) TSAF: Transmit SAF broadcast. (C) States: 1) EFS: Enter Failsafe Session State; 2) RRI: Request Reset from ING State; 3) SA: Session Activated State; 4) FSF: Failsafe Session Fail Timer Test State; and 5) TFS: Try Failsafe Security Credentials State. In an ultimate, end-state Failsafe condition, the NMM autonomously re-syncs the edge nodes in the suspect security group having the same ASR (each edge node including associated hardware, processor and memory or data store) in the then-un synced ASR security group, using the provisioning security credentials. The re-sync using provisioning security credentials occurs autonomously when all reset functions fails.

Failsafe Resynchronization System and Method. Exemplary Failsafe Resynchronization FSM State Descriptions, in connection with FIG. 12 include, but are not limited to, the following: 1) Try Failsafe (TFS) State. This state is an entry point into the Failsafe Resynchronization FSM and is entered when the current frame can be decrypted using the Failsafe Resynchronization Session Key; 2) Enter Failsafe (EFS) State. This state is an entry point into the Failsafe Resynchronization FSM and is entered when the current frame can be decrypted using the Failsafe Resynchronization Session Key; 3) Session Activated (SA) State. The FSM remains in a loop in this state, and unless there is an error or a resynch event continues to read AKM Data Frames. All frames should fall into one of two categories. Either their "Session Confirmation Flag" is set, in which case, it will transition to the CCF state. In an OR operation, the "Session Active Flag" is set, in which case, it will transition to the SA state; 4) Request ING Reset (RIR) State. This state is entered if both Fallback Resynchronization and Failsafe Resynchronization efforts have failed and the AKM security relationship must request its state be reset by either the ING or the backend configuration server. If there is no ING within the network and there is no network connectivity to the backend, then, the AKM security group's designated Arbiter Node will attempt to reconfigure the AKM security relationship minus any nodes that failed Failsafe Resynchronization. If there are not at least two nodes left to form an AKM security relationship, then, the AKM security relationship will remain disabled until a network administrator can manually refresh the AKM security relationship; and 5) Failsafe Resynchronization Session Fail Timer Test (FSF). This state is entered after the frame cannot be decrypted with any known key and it checks the Fallback Resynchronization Session Fail Timer to see if it has expired. If it has not expired, it discards the frame and returns back to the Enter Failsafe State after also sending out a Failsafe Resynchronization Session key broadcast. Conversely, if it has expired, it transitions into the Request ING Reset (RIR) State.

Failsafe Resynchronization. Exemplary Failsafe Resynchronization FSM Event Descriptions, in connection with FIG. 12 include, but are not limited to, the following: 1) Could NOT Decrypt Frame with Failsafe Resynchronization Session Key (CNDFSSK) Event—This event indicates that the current frame could not be decrypted with the Fallback Resynchronization Session Key; 2) Decrypted Frame using Failsafe Session Key (DFFSSK) Event—This event indicates that the current frame was decrypted using the Failsafe Resynchronization Session Key; 3) Failsafe Resynchronization Session (FSRS) Broadcast Time Out (FSSBTO) Event—This event indicates that the amount of time since the last FSRS broadcast frame was transmitted by the Edge Node has been exceeded; 4) Failsafe Resynchronization Session (FSRS) Fail Timer Expired (FSSFTE) Event—The amount of time allotted to resynchronize the AKM security relationship during Failsafe Resynchronization has been exceeded; 5) Failsafe Resynchronization Session (FSRS) Fail Timer has NOT Expired (FSSFTNE) Event—The amount of time allotted to resynchronize the AKM security relationship during Failsafe Resynchronization has not yet been exceeded; 6) Failsafe Resynchronization Session (FSRS) Transition Completed (FSSTC) Event—This event indicates that the Failsafe Resynchronization Session has been successful and the AKM security relationship has transitioned back into the AKM Nominal Case FSM; and, 7) Receive Failsafe Frame (RFSF) Event—This event indicates that a Fallback Resynchronization frame has been received and is ready for processing.

Exemplary Failsafe Resynchronization FSM Action Descriptions, in connection with FIG. 12, include, but are not limited to, the following: 1) Discard Frame and Test Failsafe Resynchronization Session Fail Timer (DFTFSFT) Action—This action discards the current frame and checks to see if the time allotted for the Failsafe Resynchronization Session Fail Timer has been exceeded; 2) Process Failsafe Frame (PFSF) Action—This action indicates that the current frame is a valid Failsafe Resynchronization Session frame and is processed accordingly. It is still an open question as to what exactly will be done during this processing, but that is relatively unimportant at this stage of AKM development; 3) Request ING Reset (RINGR) (ING refers to the Network Gateway Module) Action—As a representative of the AKM security relationship, the Edge Node request the AKM security relationship be reset by either the ING or the backend configuration server. If there is no ING within the network and there is no network connectivity to the backend, then, the AKM security group's designated Arbiter Node will attempt to reconfigure the AKM security relationship minus any nodes that failed Failsafe Resynchronization. If there are not at least two nodes left to form an AKM security relationship, then, the AKM security relationship will remain disabled until a network administrator can manually refresh the AKM security relationship; 4) Transmit Failsafe Resynch Session Broadcast (TFSRS) Action—This action occurs as a result of the Failsafe Resynchronization Timer expiring or transitioning into normalized Failsafe Resynchronization processing. In either case, the Failsafe Resynchronization Session FSM sends out another Failsafe Resynch Session broadcast frame in order to facilitate and expedite Failsafe resynchronization; and 5) Transmit SAF Broadcast (TSAF)—The action indicates that the edge node should issue an AKM nominal case broadcast frame with the Session Activated Flag bit set. Meaning, the edge node and its affiliated security relationship are returning back to a normal AKM FSM. In a general sense at the end point stage, the NMM autonomously re-syncs the edge nodes in the suspect security group having the same ASR (each edge node including associated hardware, processor and memory or data store) in the then-un synced ASR security group, using the provisioning security credentials. The re-sync using provisioning security credentials occurs autonomously when all reset functions fails.

Fallback Error Correction—Autonomous. An Exemplary Point-to-Point Fallback Error Correction FSM includes the following States, State Descriptions, Events and Actions. A summary of Fallback States include, but are not limited to, the following: 1) BFE: Bad Frame Error Threshold Policy State; 2) CFB: Check if Fallback Session Key can Decrypt Frame State; 3) CFS: Check Failsafe Key State; 4) CNS: Check if Next Session Key can Decrypt Frame State; 5) EFB: Enter Fallback Session FSM State; 6) FBI: Fallback Initialization State; 7) FBR: Fallback Retransmission Timer Check State; 8) FBW: Fallback Wait State; 9) FS2: Failsafe Check for 2nd Frame in Failsafe 3-Way Handshake State; 10) FS3: Failsafe Check for 3rd Frame in 3-Way Handshake State; 11) FSE: Test Failsafe Error Threshold State; 12) FSI: Failsafe Initialization State; 13) FSW: Failsafe Wait State; 14) RIR: Request ING Reset State; 15) SA: Session Activated State' 16) SS: Start State; and 17) TFB: Test Fallback Completion State.

For example, in the Point-to-Point Fallback Wait (FBW) State, the FSM traverses to this state after the Edge Node responds with the 2nd frame in the Fallback Session 3-Way handshake protocol. It then waits there for one of four events: 1) The Edge Node receives a new AKM frame; 2) The Fallback Retransmit Time-out has been exceeded; 3) The Fallback Retransmit Time-out has not been exceeded; and 4) The Fallback Error Threshold Policy has been exceeded.

In the proposed Point-to-Point Failsafe Wait (FSW) State, the FSM traverses to this state after the Edge Node responds with the 2nd frame in the Failsafe Session 3-Way handshake protocol. It then waits there for one of three events: 1) The Edge Node receives a new AKM frame; 2) The Failsafe Retransmit Time-out has been exceeded; and 3) The Failsafe Error Threshold Policy has been exceeded. It should be noted that if the Failsafe Error Threshold Policy has been exceeded, the AKM relationship must be reset externally by either the ING or the AKM Backend Configuration server, insofar as "autonomous" reconfigurations can occur. It can always be reconfigured manually, but doing so should never be required.

Both Fallback—Failsafe Resynchronization. In the exemplar Point-to-Point Request ING Reset (RIR) State, this state is entered if both Fallback Resynchronization and Failsafe Resynchronization efforts have failed and the AKM security relationship must request its state be reset by either the ING or the backend configuration server. If there is no ING within the network and there is no network connectivity to the backend, then, the AKM security group's designated Arbiter Node will attempt to reconfigure the AKM security relationship. If one of the nodes has lost all ability to connect via AKM, then, the AKM security relationship will remain disabled until a network administrator can manually refresh the AKM security relationship. By adjusting the fallback and failsafe endpoint timers, the AKM system effectively operates in an autonomous mode.

Fallback Error Correction. The Exemplary Point-to-Point Fallback Error Correction FSM includes the following State Descriptions (other processes may occur, be substituted, added, deleted or included): 1) Session Activated (SA) State—The FSM remains in a loop in this state, and unless there is an error or a resynch event continues to read AKM Data Frames; 2) All frames should fall into one of two categories. Either their "Session Confirmation Flag" is set, in which case, it will transition to the CCF state. In an OR operation, the "Session Active Flag" is set, in which case, it will transition to the SA state; 3) Session Start (SS) State— Each ASR has an ascending order of priority that determines which node within the ASR will transmit the SEF first. If within a preconfigured time, that does not begin transmitting after power-on reset, the next node by order of priority will transmit the SEF, and so on, until finally one of the nodes within the ASR is successful at starting the session. It should be noted that the Session Establishment Frame SEF) is a normal AKM Data Frame (ADF), with whatever payload the sender wishes to send. The only difference is that the SIF bit flag is set and remains set until the other node in the PTP relationship responds, at which time, it will then set the SAF bit (which is the Session Active bit); 4) Test Fallback (TFB) Completion State—This state test whether or not the Fallback Resynchronization process has completed by receiving the final frame in the Fallback 3-Way protocol; and, 5) Non-Fatal Exception (NFE) State—This state is entered whenever there is a State/Event transition that is not expected within the FSM. Meaning, an event occurred within a particular state that should not have occurred while in that state. Thus, the FSM needs to go to this state as a means of capturing whatever data it can in order to determine how that happened (that the FSM had a State/Event transition that was not expected).

The Exemplary Point-to-Point Fallback Error Correction FSM includes the following Events (other processes may occur and be included): Bad Frame Error Threshold Exceeded (BFETPE) Event; Bad Frame Error Threshold NOT Exceeded (BFETPE) Event; Could NOT Decrypt Frame with Fallback nor Failsafe Keys (CNDFFBFSK) Event; Could NOT Decrypt Frame with CS, NS, or FB Keys (CNDFCSNSFB) Event; Could NOT Decrypt Frame and Failsafe Error Threshold NOT Exceeded (CNDFFSETNE) Event (implying the FSM should remain within the Failsafe Resynchronization session); Could NOT Decrypt Frame with Failsafe Key (CNDFFSK) Event; Could NOT Decrypt Frame with Failsafe Key (CNDFFSK) Event; Could NOT Decrypt Frame with NS-BEK (NDNS) Event; Decrypted Inbound AKM Frame with CS-BEK (DIAFCSK) Event (current frame was successfully decrypted); Decrypted Inbound AKM Frame with FB-BEK (DIAFFBK) Event (successfully decrypted using Fallback); Decrypted Inbound AKM Frame with NS-BEK (DIAFNSK) Event (successfully decrypted using the current session's BEK (i.e., NS-BEK)); Decrypted Inbound AKM Frame with FS-BEK (DIAFFSK) Event (successfully decrypted); Fallback Retransmit Timer Exceeded (FBRTTE) Event (retransmit another Fallback Frame); Fallback Retransmit Timer NOT Exceeded (FBRTTE) Event; Fallback Error Threshold Exceeded (FBETE) Event (FSM transitions to Failsafe); Fallback Error Threshold NOT Exceeded (FRETNE) Event; Failsafe Error Threshold Exceeded (FSETE) Event (transition to Request ING Reset (RIR) state); Failsafe Error Threshold NOT Exceeded (FSETNE) Event; Failsafe Retransmit Timer Exceeded (FSRTTE) Event (re-transmit another Failsafe Session Notification Frame to resynch); Receive AF (RAF) Event (AKM Frame received—ready for processing); Received 3rd part of Failsafe 3-Way Handshake Session Establishment Protocol (R3FS3WHS) Event (received the $3^{rd}$/final frame in Failsafe Resynch 3-Way Handshake—now transition to normal communication); Received 2nd part of Failsafe 3-Way Handshake Session Establishment Protocol (RP2FS3WHS) Event; Start AKM (SAKM) Event; and Transmit AKM Frame with CS-BEK (TAFCS) Event (AKM Frame encrypted with the current session key (CS-BEK) and subsequently transmitted).

The Exemplary Point-to-Point Fallback Error Correction FSM includes the following Actions (other processes may occur and be included or excluded): 1) Attempt to Decrypt with Fallback Resynchronization Session Key (ADFSK) Action—This action implicitly indicates that attempts to decrypt the current frame with the Fallback Resynchronization Session key; 2) Attempt to Decrypt with Failsafe Resynchronization Session Key (ADFSK) Action—This action implicitly indicates that attempts to decrypt the current frame with the Fallback Resynchronization Session key; 3) Set CS-BEK to FB Key & Transmit AKM Session Announcement Frame (CSTFBTASAF) Action—This action updates the current session key with the current Fallback Session Key and subsequently sends out a Session Announcement Frame (by setting the Session Announcement bit in a regular frame) to let the other endpoint know that a new session has started; 4) Set CS-BEK to FS Key & Transmit AKM Session Announcement Frame (CSTFS-TASAF) Action—This action updates the current session key with the current Failsafe Session Key and subsequently sends out a Session Announcement Frame (by setting the Session Announcement bit in a regular frame) to let the other endpoint know that a new session has started; 5) Discard Frame (DF) Action—This action discards the current frame. Discard Frame, Respond with 1st Failsafe Frame in 3-Way Failsafe Handshake; 6) (DFRP13WFSHS) Action—This action discards the current Fallback frame (which could not be decrypted) and then initiates Failsafe Resynchronization by transmitting out the 1st Failsafe frame in the 3-Way Failsafe Handshake protocol; 7) Discard Frame and Transmit 1st FB Frame in 3-Way Fallback Handshake (DFT1FBF3WFBHS) Action—This action discards the current frame (which could not be decrypted) and then initiates Fallback Resynchronization by transmitting out the 1st Fallback frame in the 3-Way Fallback Handshake protocol; 8) Discard Frame and Transmit 1st FS Frame in 3-Way Failsafe Handshake (DFT1FSF3WFSHS) Action—This action discards the current frame (which could not be decrypted) and then initiates Failsafe Resynchronization by transmitting out the 1st Failsafe frame in the 3-Way Failsafe Handshake protocol; 9) Discard Frame and Test Fallback Resynchronization Session Fail Timer (DFTFBSFT) Action—This action discards the current frame and checks to see if the time allotted for the Fallback Resynchronization Session Fail Timer has been exceeded; 10) Discard Frame and TransmitAKM Session Announcement Frame (DF-TASAF) Action—This action discards the current frame and then transmits an AKM session announcement frame, which is generally transmit at the beginning of a new session; 11) Discard Frame and Test Fallback Retransmit Timeout Policy (TFBRTTOP) Action—This action discards the current frame and then tests to see if the Fallback Retransmit Timeout Policy has been exceeded or not; 12) Do Nothing (DN) Action—This action represents that the FSM should not take any direct action as a consequence of this state/event transition; 13) Enter Fallback Mode and Transmit 2nd FB Frame of 3-way Handshake (EFMT23HS) Action—This action occurs after the FSM enters the Fallback 3-Way Handshake as a consequence of receiving the 1st Fallback Frame of the 3-way Fallback handshake protocol and subsequently responds with the 2nd Fallback Frame in the 3-way Fallback handshake protocol; 13) Inbound AKM Frame Processing (IAFP) Action—This action represents the processing of an inbound AKM frame, including the decryption; 14) Outbound AKM Frame Processing (OAFP) Action—This action represents the processing of an outbound AKM frame, including the encryption; 15) Retry Decryption with Fallback Session Key (RDFBSK) Action—This action implicitly indicates that attempts to decrypt the current frame with the current and next session keys have failed and the Fallback Session key should now be tried for decrypting the current frame; 16) Retry Decryption with Next Session Key (RDNSK) Action—This action implicitly indicates that attempts to decrypt the current frame with the current session key has failed and the next session key should now be tried for decrypting the current frame; 17) Request ING Reset (RINGR) Action—As a representative of the AKM security relationship, the Edge Node requests that the AKM security relationship be reset by either the ING or the backend configuration server. If there is no ING within the network and there is no network connectivity to the backend, then, the AKM security group's designated Arbiter Node will attempt to reconfigure the AKM security relationship. If both nodes are no longer present within the AKM PTP security relationship, then, the AKM security relationship will remain disabled until a network administrator can manually refresh the AKM PTP security relationship; and 18) Respond with 2nd Failsafe Frame in 3-Way Failsafe Handshake (RP23WFSHS) Action—This action occurs as a consequence of receiving the 1st Failsafe Frame of the 3-way Failsafe handshake protocol and subsequently responds with the 2nd Failsafe Frame in the 3-way Failsafe handshake protocol; 19) Transmit 1st Fallback Frame in 3-Way Fallback Handshake (T1FBF3WFBHS) Action— This action initiates the Fallback 3-Way Handshake by sending the first frame in the aforementioned Fallback Session 3-Way Handshake protocol; 20) Transmit 1st Failsafe Frame in 3-Way Fallback Handshake (T1FSF3WFSHS) Action—This action initiates the Failsafe 3-Way Handshake by sending the first frame in the aforementioned Failsafe Session 3-Way Handshake protocol; 21) Transmit 2nd Fallback Frame in 3-Way Fallback Handshake (T2FBF3WFBHS) Action—This action responds to the 1st FB Frame in the Fallback 3-Way Handshake by sending the 2nd FB frame in the aforementioned Fallback Session 3-Way Handshake protocol; 22) Test Frame Error Threshold Policy (TFETP) Action—This action tests to see if the Fallback Frame Error Threshold Policy has been exceeded or not; 23) Test Frame Failsafe Error Threshold Policy (TFFSETP) Action—This action tests to see if the Failsafe Error Threshold policy has been exceeded; 24) Transmit PTP SE Frame (TPSAF) Action—This action transmit a PTP Session Announcement Frame; and 25) Transmit PTP SE Frame (TPSEF) Action—This action transmit a PTP Session Establishment Frame.

It is important to know that the embodiments illustrated herein and described herein below are only examples of the many advantageous uses of the innovative teachings set forth herein. In general, statements made in the specification of the present applications do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The aspects of present invention could be produced in hardware (the security enclave) or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk or removable drive or data store, as would be known to one of ordinary skill in the art. Further, some portions of the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

Those of skill in the art will appreciate that the various illustrative modules, components, and method steps described in connection with the above-described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, components, engines, and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm and the functionality of a component, engine, or module described in connection with the embodiments disclosed herein can be embodied directly in hardware, in software executed by a processor, or in a combination of the two. Software can reside in computer or controller accessible computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention.

The claims appended hereto are meant to cover modifications and changes within the scope and spirit of the present invention. What is claimed is:

The invention claimed is:

1. In a computative system including a plurality of edge nodes communicatively coupled to a network, a data security system for at least first and second edge nodes of the plurality of edge nodes enabled to communicate with each other, the data security system comprising:

the first edge node having a first processor, a first data store storing a first file, the first data store having a first secure enclave storing a first hash message authentication code (first HMAC) based upon a predetermined hash function applied to the first processor and the first data store at a first initial time, the first HMAC incorporating a bounded firmware image and hardware data for the first node;

the second edge node having second processor, a second data store storing a second file, the second data store having a second secure enclave storing a second HMAC based upon the hash function applied to the second processor and the second data store at a second initial time, the second HMAC incorporating a bounded firmware image and hardware data for the second node;

the first and the second nodes having respective first and second network modules communicatively coupled to the network;

at a security provisioning time, the first edge node obtaining the second HMAC, applying a third hash function to both the first HMAC and the second HMAC to obtain a security data set (SDSet), and the first edge node processor storing the SDSet in both first and second secure enclaves;

at a messaging time, the first edge node and first processor generating and sending a first message incorporating the SDSet and the second HMAC to the second edge node; and the second edge module and second processor accepting the first message if the SDSset and the second HMAC in the first message match an enclaved SDSset and second HMAC.

2. In the computative system, the data security system as claimed in claim 1 wherein the first HMAC is a first SHA hash and is keyed to the first processor and first data store, and the second HMAC is a second SHA hash and is keyed to the second processor and second data store, such that first and second keyed HMACs are unique to the respective first and second edge nodes, and the SDSet configured as a dual hash.

3. In the computative system, the data security system as claimed in claim 2 wherein
prior to the security provisioning time, the second processor sending and effecting storage of the second HMAC to the first data store via the first processor.

4. In the computative system, the data security system as claimed in claim 2 wherein the second secure enclave is encased in an enclave security device from the group of enclaves including a hardware device data store, a dedicated data store, an onboard data store, an attachable data store, a fob, a dongle, and a flash memory drive.

5. In the computative system, the data security system as claimed in claim 3 including a network manager, wherein the network manager includes a network manager data store which is a database or an organized data structure, wherein the network manager and the first and second edge nodes form a key managed security relation group by sharing the SDSet, and wherein the network manager stores the first and second HMACs and the SDSet in the database or data structure, and wherein the first message includes a message payload.

6. In the computative system, the data security system as claimed in claim 1 including a network manager and the system includes:

in the network manager (NM), a NM processor, a NM data store and a NM network module communicatively coupled to the network;

a third edge node having a third processor, a third data store, a third secure enclave and a third network module communicatively coupled to the network;

the NM data store storing the first, second and a third HMAC based upon a third hash function applied to the third processor and the third data store at a respective initialization time via the NM;

at the security provisioning time after the respective initialization time, the NM applying a fourth hash function to the first, second and third HMACs to obtain a network security data set (nSDSet) and effecting respective storage of the nSDSet in corresponding first, second and third secure enclaves;

at one messaging time, the network manager generating and sending the first message incorporating the nSDSet and the second HMAC to the second edge node;

at another messaging time, the network manager generating and sending another message incorporating the nSDSet and the second HMAC and the third HMAC respectively to the second and third edge nodes;

the second edge node accepting the first message if the nSDSset and the second HMAC in the first message match an enclaved nSDSset and second HMAC; and the second and third edge nodes accepting the another message if the nSDSset and the respective second and third HMACs in the another message match an enclaved nSDSset and corresponding second and third HMACs.

7. In the computative system, the data security system as claimed in claim 6 wherein the another message is a second message, and wherein the second and third HMACs in combination with the nSDSet, are respective second and third digital signatures of the second and third edge nodes;

at a third message time, network manager generating a third message having a message payload and a frame header digital signature, the frame header digital signature including at least one of the second and third digital signatures;

the first processor encrypting the payload and the frame header digital signature with an encryption routine;

formatting the third message with a relationship ID associating the network manager and a designated edge node which is at least one of the second and third edge nodes and wherein the relationship ID is not an encrypted portion of the third message; and the designated edge node accepting the third message and the message payload after decrypting the frame header digital signature using a complementary decryption routine, when the frame header digital signature matches a corresponding one of the second and third HMACs and the nSDSet in the designated edge node secure enclave.

8. In the computative system, the data security system as claimed in claim 7 wherein the message payload represents data in-transit, and the respective second and third processor in the designated edge node processes the data in-transit.

9. In the computative system, the data security system as claimed in claim 7 wherein the network manager and the NM processor generates a next message session security credential, refreshed for each third message and following message, specific for a security relationship between the network manager and the second and third edge nodes per the nSDSet, the next message credential including a parameter data vector (PDV) as an implementation specific vector used across the second and third nodes within the security relationship.

10. In the computative system, the data security system as claimed in claim 1 wherein the hash for the first and second HMAC is a first hash function and the hash function for the SDSet is a second hash function.

11. In a computative system including a network manager and a plurality of edge nodes communicatively coupled together via to a network, a data security system for at least first and second edge nodes of the plurality of edge nodes comprising:

the network manager (NM) having a NM processor, a NM data store as a database or an organized data structure, a NM edge network module communicatively coupled to the network, the NM data store storing an NM identifier;

the first edge node having a first processor, a first data store storing a first file, the first data store having a first secure enclave storing a first hash message authentication code (first HMAC) based upon the hash function applied to the first processor, the first data store, and an image of the first file, at a first edge provisioning time, the first HMAC incorporating a bounded firmware image and hardware data for the first node;

the second edge node having a second processor, a second data store storing a second file, the second data store having a second secure enclave storing a second HMAC based upon the hash function applied to the second processor, the second data store, an image of the second file, at a second edge provisioning time, the second HMAC incorporating a bounded firmware image and hardware data for the second node;

the NM obtaining and storing the first and second HMAC in the NM data store;

at a security provisioning time, the NM processor applies the hash function to the NM identifier and the first and second HMAC to obtain a security data set (SDSet), and stores the SDSet in the NM data store and in respective first and second secure enclaves;

wherein at a messaging time, communications between the NM and at least one of the first or second edge nodes is enabled only if the respective at least of one first or second HMAC and the SDSet matches a NM presented first or second HMAC and a NM presented SDSet in a message.

12. In the computative system, the data security system as claimed in claim 11 wherein the first HMAC is a first SHA hash and the second HMAC is a second SHA hash, the security system including a configuration database server communicatively coupled to the network, the NM acting as a proxy for the server and the server maintaining a portion of the NM data store.

13. In the computative system, the data security system as claimed in claim 12, the SDSet establishing s security relationship between the NM and the first and second edge nodes.

14. In the computative system, the data security system as claimed in claim 13, at least one of the respective files in the first and second edge nodes is a firmware release for at least one specific hardware in the corresponding first and second edge nodes and the corresponding hash for the first and second HMAC includes the firmware release.

15. In the computative system, the data security system as claimed in claim 14, at least one of first and second edge nodes includes a corresponding hardware component and the corresponding hardware component has a manufacturer assigned identifier or an NM assigned identifier, and the corresponding hash for the first and second HMAC includes at least one of the manufacturer assigned identifier and the NM assigned identifier.

16. In the computative system, the data security system as claimed in claim 11, at least one of the first and second edge nodes includes a firmware release file and the at least one of the first and second edge nodes includes a corresponding hardware component, the corresponding hardware component having a manufacturer assigned identifier or an NM assigned identifier, and the corresponding hash for the first and second HMAC including (i) at least one of the manufacturer assigned identifier and the NM assigned identifier and (ii) a firmware file image.

17. In the computative system, the data security system as claimed in claim 11 wherein the hash for the NM HMAC and the first and second HMAC is a first hash function and the hash function for the SDSet is a second hash function.

18. A method of establishing and maintaining secure data communications in a computative system having at least first and second edge nodes of a plurality of edge nodes enabled to communicate with each other over a network comprising:

providing the first edge node with a first processor, a first data store storing a first file, and a first secure enclave;

providing the second edge node with a second processor, a second data store storing a second file, and a second secure enclave;

respectively generating and storing, in the corresponding first and second enclave, a first and a second hash message authentication code (HMAC) based upon the corresponding first and second processor and first and second data store of the respective first and second edge nodes, the first and second HMACs stored in respective enclaves incorporating corresponding bounded firmware images for the first and second nodes;

generating and storing, in the first and second enclave, a security data set (SDSet) as a further hash of both the first and second HMAC; and enabling processing of a message payload only if the message has a transmitted SDSet and a transmitted HMAC, which transmitted HMAC matches a respective first or second HMAC stored in the corresponding first or second enclave, and the transmitted SDSet matches the SDSet stored in the corresponding first or second enclave.

19. The method of establishing and maintaining secure communications as claimed in claim 18 wherein the first HMAC is a first SHA hash and the second HMAC is a second SHA hash and wherein the SDSet is a dual hash including representations of the first and second HMAC.

20. The method of establishing and maintaining secure communications as claimed in claim 19 including providing, in at least one of the first and second enclave, a respective enclave security device from the group of enclave security devices including a hardware device data store, a dedicated data store, an onboard data store, an attachable data store, a fob, a dongle, and a flash memory drive; and
storing the corresponding first and second HMAC in the respective enclave security device.

21. The method of establishing and maintaining secure communications as claimed in claim 18 including:
providing a network manager having a third edge node, a third processor, a third data store, and a third secure enclave, the network manager communicatively coupled to the network;
storing in the third enclave a network manager identifier;
wherein the generation of the SDSet includes a fourth hash of the first HMAC, the second HMAC and the network manager identifier;
the network manager generating and transmitting the communicated message with the message payload and the transmitted SDSet and the transmitted HMAC to both the first and second edge nodes; and
the message payload only processed by a corresponding first and second edge node if the transmitted SDSet and the transmitted HMAC matches a respective first and second HMAC stored in the corresponding first and second enclave of the corresponding first and second edge nodes.

22. The method of establishing and maintaining secure communications as claimed in claim 21 wherein:
generating respective first and second digital signatures with an additional hash of the corresponding first and second HMACs and the enclaved SDSet;
generating, with the network manager, a header frame with at least one of the first and second digital signatures as a portion of the communicated message;
encrypting, with the first processor, the payload and the frame header digital signature with an encryption routine;
formatting the communicated message with a relationship ID associating the network manager and a designated edge node which is at least one of the first and second edge nodes, wherein the relationship ID is not encrypted; and
after decrypting the frame header digital signature, via a respective first and second processor using a complementary decryption routine, accepting the communicated message at the designated edge node and accepting the message payload when a decrypted frame header digital signature matches a corresponding one of the first and second digital signatures and further matches the SDSet in the designated edge node secure enclave.

23. A method of establishing and maintaining secure data communications in a computative system having a network manager and a first and a second edge node, all communicatively coupled together via to a network, comprising:
providing the network manager (NM) with a NM processor, a NM data store as a database or an organized data structure, a NM secure enclave and a NM edge node coupled to the network;
providing the first edge node with a first processor, a first data store storing a first file, and a first secure enclave;
providing the second edge node with a second processor, a second data store storing a second file, and a second secure enclave;
generating and storing, in the NM enclave, a NM hash message authentication code (NM HMAC) based upon the NM processor and a portion of the NM data store;
respectively generating and storing, in the corresponding first and second enclave, a respective first and second HMAC based upon the corresponding first and second processor and the corresponding first and second data store of the respective first and second edge nodes, the first and second HMACs stored in respective enclaves incorporating corresponding bounded firmware images for the first and second nodes;
at a security provisioning time, the NM applying a hash function to the NM HMAC and the first and second HMAC to obtain a security data set (SDSet), and storing the SDSet in the NM enclave and the first and second enclaves, and;
wherein at a messaging time, communications between the NM and the first edge node is enabled only if the first HMAC and the SDSet matches a NM presented first HMAC and a NM presented SDSet in a message.

24. The method of establishing and maintaining secure data communications as claimed in claim 23 wherein the first HMAC is a first SHA hash and the second HMAC is a second SHA hash, and the method including:
providing a configuration database server communicatively coupled to the network, wherein the NM edge node is a proxy for the server on the network.

25. The method of establishing and maintaining secure data communications as claimed in claim 24 wherein at least one of the respective files in the first and second edge nodes is a firmware release for at least one specific hardware in the corresponding first and second edge nodes; and
wherein at least one of the first and second HMAC includes a representation of the firmware.

26. The method of establishing and maintaining secure data communications as claimed in claim 25 including:
providing, in at least one of first and second edge nodes, a corresponding hardware component wherein the corresponding hardware component has a manufacturer assigned identifier or an NM assigned identifier;
wherein the corresponding hash for the first and second HMAC includes a representation of at least one of the manufacturer assigned identifier and the NM assigned identifier.

* * * * *